United States Patent
Nakamura et al.

[11] Patent Number: 5,926,306
[45] Date of Patent: Jul. 20, 1999

[54] IMAGE FORMING LIGHT SCANNING APPARATUS

[75] Inventors: Hiromu Nakamura; Toshio Naiki, both of Toyokawa; Etsuko Shibata, Toyohashi; Satoru Ono, Toyokawa, all of Japan

[73] Assignee: Minolta Co., Ltd., Osaka, Japan

[21] Appl. No.: 08/948,852

[22] Filed: Oct. 10, 1997

Related U.S. Application Data

[62] Division of application No. 08/620,103, Mar. 21, 1996, Pat. No. 5,721,631, which is a division of application No. 08/296,020, Aug. 25, 1994, Pat. No. 5,563,729.

[30] Foreign Application Priority Data

Aug. 30, 1993 [JP] Japan .................................. 5-214311
Dec. 21, 1993 [JP] Japan .................................. 5-322556
May 16, 1994 [JP] Japan .................................. 6-101102

[51] Int. Cl.⁶ .................................................. G02B 26/08
[52] U.S. Cl. ........................ 359/206; 205/207; 205/216; 205/662
[58] Field of Search .................................. 359/205–207, 359/216–219, 662, 708, 711, 718

[56] References Cited

U.S. PATENT DOCUMENTS

| | | |
|---|---|---|
| 4,934,772 | 6/1990 | Sakuma et al. . |
| 4,962,982 | 10/1990 | Takanashi . |
| 4,971,411 | 11/1990 | Takanashi . |
| 5,025,268 | 6/1991 | Arimoto et al. . |
| 5,111,219 | 5/1992 | Makino . |
| 5,128,795 | 7/1992 | Endou et al. . |

FOREIGN PATENT DOCUMENTS

| | | |
|---|---|---|
| 62-139520 | 6/1987 | Japan . |
| 63-157122 | 6/1988 | Japan . |

*Primary Examiner*—James Phan
*Attorney, Agent, or Firm*—Price, Gess & Ubell

[57] ABSTRACT

A scanning apparatus has a luminous flux deflector and a single fθ lens. The deflector deflects a convergent luminous flux on a scanned surface at a uniform angular velocity. The fθ lens is arranged between the deflector and the scanned surface. The fθ lens is bi-convex in a main scanning direction and is made of a material having a refractive index of at most 1.6. One surface of the fθ lens in a main scanning direction is so curved that a radius of curvature in the main scanning direction A decreases as an angle of view in the main scanning direction increases.

5 Claims, 29 Drawing Sheets

FIG. 4
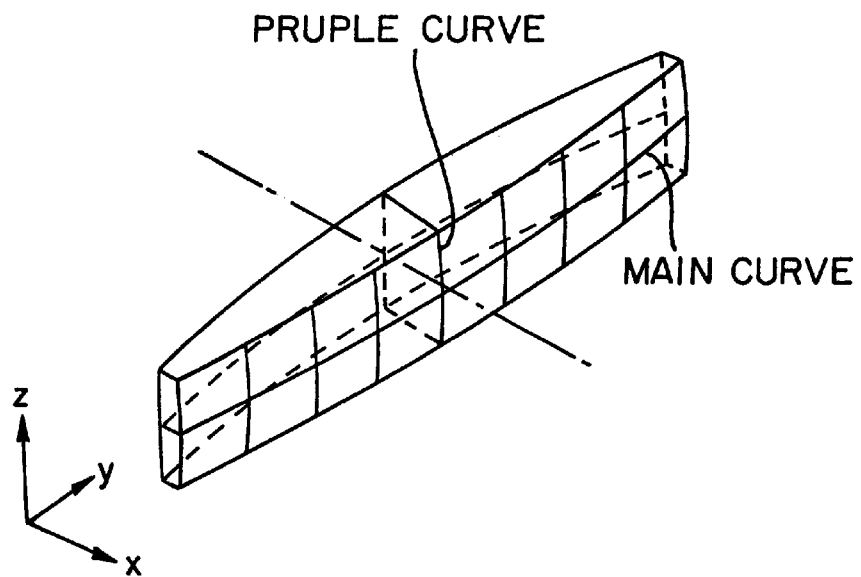
FIG. 5A
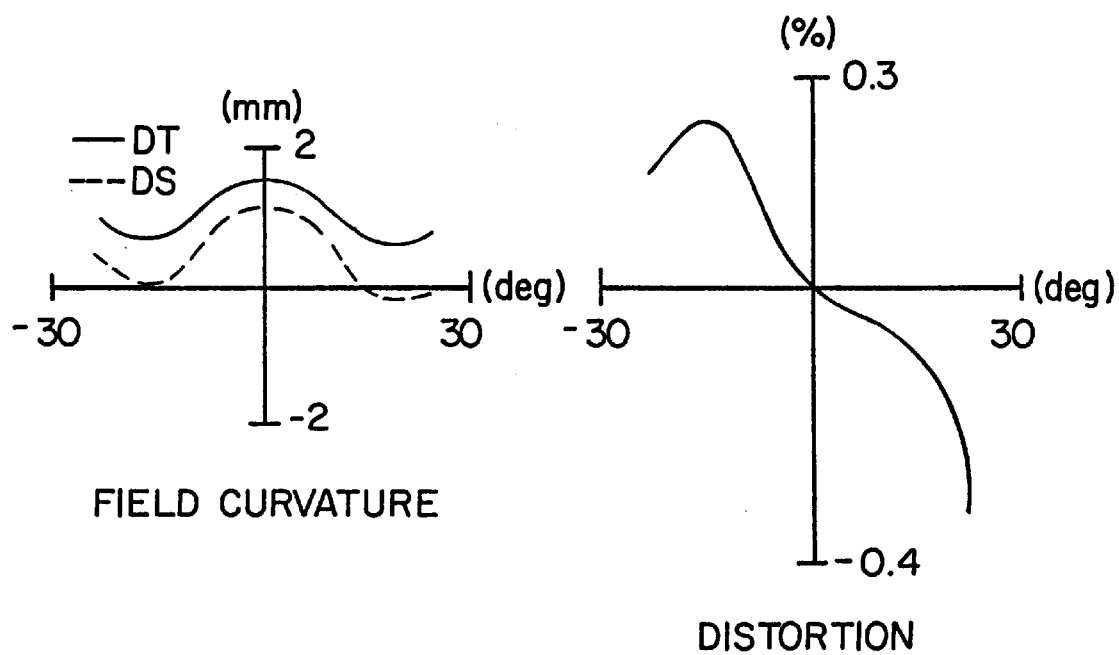
FIELD CURVATURE
FIG. 5B
DISTORTION

FIELD CURVATURE

DISTORTION

FIELD CURVATURE

DISTORTION

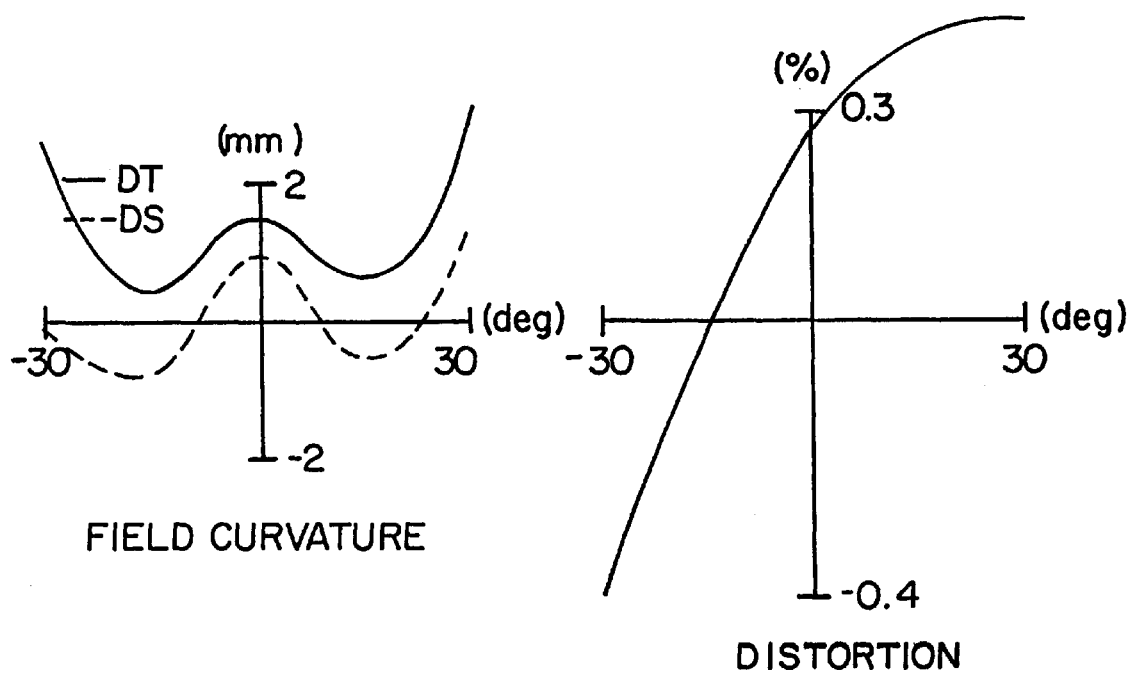
FIG. 8A FIELD CURVATURE
FIG. 8B DISTORTION
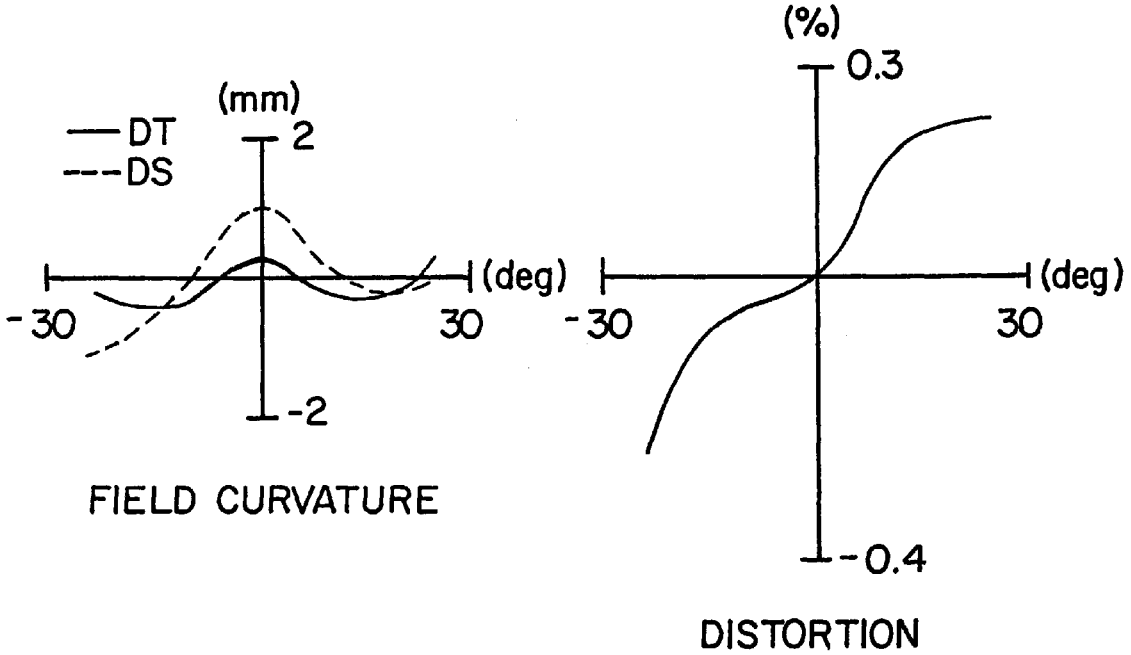
FIG. 9A FIELD CURVATURE
FIG. 9B DISTORTION

FIELD CURVATURE

DISTORTION

FIELD CURVATURE

DISTORTION

FIELD CURVATURE IN MAIN SCANNING DIRECTION (mm)

DISTORTION (%)

FIELD CURVATURE
IN MAIN SCANNING
DIRECTION (mm)

DISTORTION (‰)

ANGLE OF DEFLECTION (deg)

FIELD CURVATURE IN MAIN SCANNING DIRECTION (mm)

ANGLE OF DEFLECTION (deg)

DISTORTION (%)

FIELD CURVATURE IN MAIN SCANNING DIRECTION (mm)

DISTORTION (%)

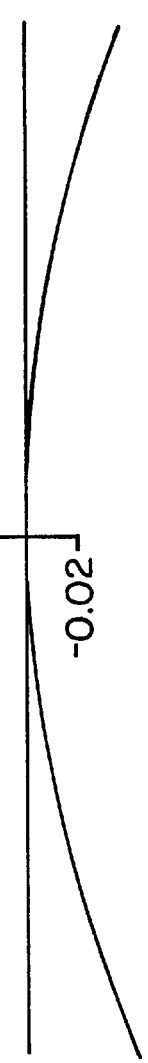
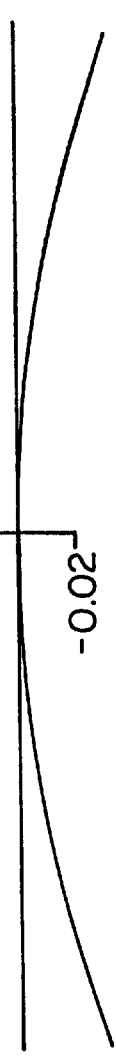
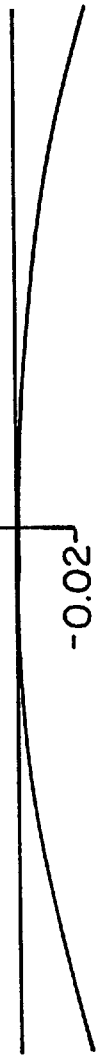
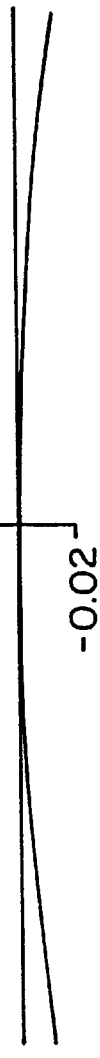
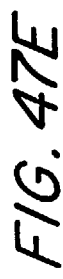
FIG. 47A
FIG. 47B
FIG. 47C
FIG. 47D
FIG. 47E

IMAGE FORMING LIGHT SCANNING APPARATUS

This is a division of U.S. Ser. No. 08/620,103, filed on Mar. 21, 1996, now U.S. Pat. No. 5,721,631, which is a division of U.S. Ser. No. 08/296,020, filed on Aug. 25, 1994, and issued as U.S. Pat. No. 5,563,729 on Oct. 8, 1996.

BACKGROUND OF THE INVENTION

1. Field of the Invention

The present invention relates to a scanning apparatus which forms an image on a scanned surface by a deflected luminous flux, and more particularly relates to a scanning apparatus having a lens system for forming an image by a luminous flux deflected by a deflector at a uniform angular velocity.

2. Description of the Prior Art

A laser scanning apparatus for use in a laser beam printer is known in which after a divergent beam from a laser beam source is converged by a collimator lens, the beam is deflected at a uniform angular velocity by a deflector such as a polygonal mirror, and a scanning lens system forms the beam into a laser beam spot on a scanned surface and scans the scanned surface substantially at a uniform velocity. As the scanning lens systems using an fθ lens, many lens systems including a plurality of lenses have been proposed and pout into practical use.

Simpler scanning optical systems each using a single scanning lens (single fθ lens) are disclosed by Japanese Laid-open Patent Applications Nos. H3-213812 and H4-50908.

The scanning optical systems disclosed by Japanese Laid-open Patent Application No. H3-213812 use a single bi-convex lens or a positive meniscus lens as the fθ lens. In the optical systems using the bi-convex lens, coma is restrained in the vicinity of the maximum angle of deflection (angle of deflection is an angle of view between a luminous flux reflected at the reflecting surface and the optical axis. The maximum angle of deflection is the maximum of the angle of view), and field curvature in the main scanning direction and distortion are corrected by providing an aspherical surface for the second surface of the lens. In the optical systems using the positive meniscus lens, field curvature in the main scanning direction and distortion are corrected by using a meniscus lens whose second surface is aspherical and by arranging the meniscus lens so as to be convex to the side of the deflector.

The scanning optical systems disclosed by Japanese Laid-open Patent Application No. H4-50908 use a scanning lens whose both side surfaces are aspherical.

In the scanning optical systems of these laid-open patent applications, a convergent luminous flux is incident on the scanning lens. This is because if a parallel luminous flux is incident, the surface configuration in the main scanning direction must be defined to obtain a refractive power in the main scanning direction, and field curvature in the main scanning direction and distortion cannot sufficiently be corrected.

However, the scanning optical systems of Japanese Laid-open Patent Application No. H3-213812 are defective in performance since distortion is not sufficiently corrected although field curvature in the main scanning direction is sufficiently corrected by providing an aspherical surface for the second surface of the scanning lens. Then, the desired uniform-velocity scanning is not realized. Further, in the opticalsystem, the thickness difference difference in thickness of the lens between in the vicinity of the maximum angle of deflection and on the optical axis) of the scanning lens is large. Because of the large thickness difference, the following problems arise in molding this scanning lens: the lens surfaces cannot be molded with accuracy; the physical characteristics inside the lens cannot be made uniform; and the amount of shift of the image surface increases which is caused by a change in lens surface configuration or in refractive index due to an increase in temperature or humidity. These problems are remarkable when a resin made scanning lens is used. When a glass made lens is used like in Japanese Laid-open Patent Application No. H3-213812, the cost of the lens increases.

In the scanning optical systems disclosed by Japanese Laid-open Patent Application No. H4-50908, the scanning lens is very difficult to mold since its both side surfaces are aspherical surfaces of very complicated configurations.

Various scanning lenses of a type including one fθ lens for forming an image by a luminous flux deflected by a deflector on a scanned surface have also been disclosed by Japanese Laid-open Patent Applications Nos. S62-139520 and S63-157122.

However, according to the conventional arrangements, it is difficult to reduce the size of the whole apparatus while maintainingdesired optical performance. The size of the whole apparatus can be reduced by widening the range of the angle of view, i.e. the angle of deflection of the scanning lens to decrease the scanning optical path. However, if the range of the angle of deflection is widen while maintaining the desired optical performance, the distance between the point of deflection and the image surface, and the length of the lens in the main scanning direction increase, thereby increasing the size of the whole apparatus.

For example, in Japanese Laid-open Patent Application No. H3-213812, since the distance from the deflector to the scanning lens is as much as 60 mm, the length of the lens must be increased to widen the range of the angle of deflection. To decrease the length of the lens, the range of the angle of deflection must be narrowed. Thus, the range of the angle of deflection cannot be widened unless the distance from the deflecting surface to the image surface is increased.

In Japanese Laid-open Patent Application No. H4-50908, although the distance from the point of deflection to the scanning lens is 15 mm, the widening of the range of the angle of deflection by decreasing the distance between the scanning lens and the deflector does not directly contribute to the reduction in length of the lens in the main scanning direction. This is because since the curvature of the first surface in the vicinity of the optical axis is convex to the point of deflection, when the angle of deflection increases, the distance between the position at which the luminous flux is incident on the lens surface and the image surface is shorter than the distance between the position of the optical axis on the lens surface and the image surface. In addition, since an aspherical surface of the scanning lens in the main scanning direction is configured to have at least two points of inflection, the mold therefor is difficult to process.

In Japanese Laid-open Patent Applications Nos. S62-139520 and S63-157122, the light beam incident on the deflector is a parallel luminous flux. In the scanning lens using a parallel luminous flux, since aberrations are largely deteriorated when the angle of deflection is large, the angle of deflection cannot be increased, which results in an increase in size of the whole apparatus. In Japanese Laid-open Patent Application No. S62-139520, the scanning lens is of a design ignoring coma. In Japanese Laid-open Patent Application No. S63-157122, although the distance from the deflector to the scanning lens is 10 mm, the thickness of the center of the lens is as much as 30 mm to 60 mm. Further, although the angle of deflection is increased, the increase in angle of deflection makes substantially no contribution to the reduction in size of the apparatus since the distance from the scanning lens to the image surface is as much as 170 mm.

SUMMARY OF THE INVENTION

An object of the present invention is to provide a scanning apparatus where field curvature in the main scanning direction and distortion are excellently corrected, and the surface configuration of the fθ lens is simple and easy to process.

Another object of the present invention is to provide a scanning optical system using a low-cost scanning lens which is easy to mold and where the thickness difference is restrained.

The object of the present invention is to provide a scanning lens achieving a reduction in distance from the point of deflection to the image surface and in length of the lens in the main scanning direction, and the widening of the range of the angle of deflection while maintaining desired optical performance.

BRIEF DESCRIPTION OF THE DRAWINGS

These and other objects and features of this invention will become clear from the following description, taken in conjunction with the preferred embodiments with reference to the accompanied drawings in which:

FIG. 4 is a view of assistance in explaining a deformed toric surface;

FIGS. 5A and 5B show aberration curves of a first embodiment of the present invention;

FIGS. 8A and 8B show aberration curves of a fourth embodiment of the present invention;

FIGS. 9A and 9B show aberration curves of a fifth embodiment of the present invention;

FIGS. 47A to 47E show lateral aberrations of the nineteenth embodiment.

DESCRIPTION OF THE PREFERRED EMBODIMENTS

Hereinafter, embodiments of the present invention will be described.

Figure 1:
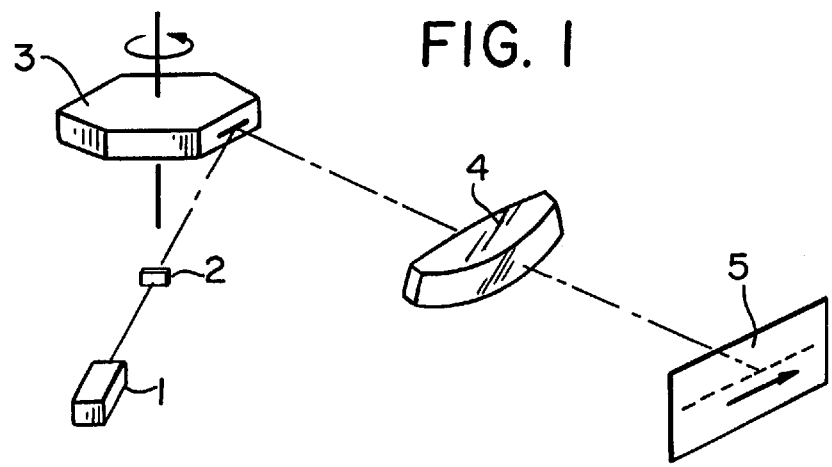
FIG. 1 is a perspective view of the arrangement of a scanning apparatus embodying the present invention.

Referring to FIG. 1, there is shown an arrangement of a scanning apparatus embodying the present invention. In the scanning apparatus, a luminous flux from a light source 1 is converged by an optical member 2, and is incident on a deflecting surface of a deflector (polygonal mirror) 3. The converged luminous flux deflected by the rotating polygonal mirror 3 at a uniform angular velocity passes through a single fθ lens 4 and is directed to a scanned surface 5 to form an image thereon. At this time, it scans the scanned surface substantially at a uniform angular velocity. In this specification, the main scanning direction is a direction in which a luminous flux (light spot on the scanned surface) moves in accordance with the rotation of the deflector, and a sub scanning direction is a direction perpendicular to the main scanning direction.

Figure 2:
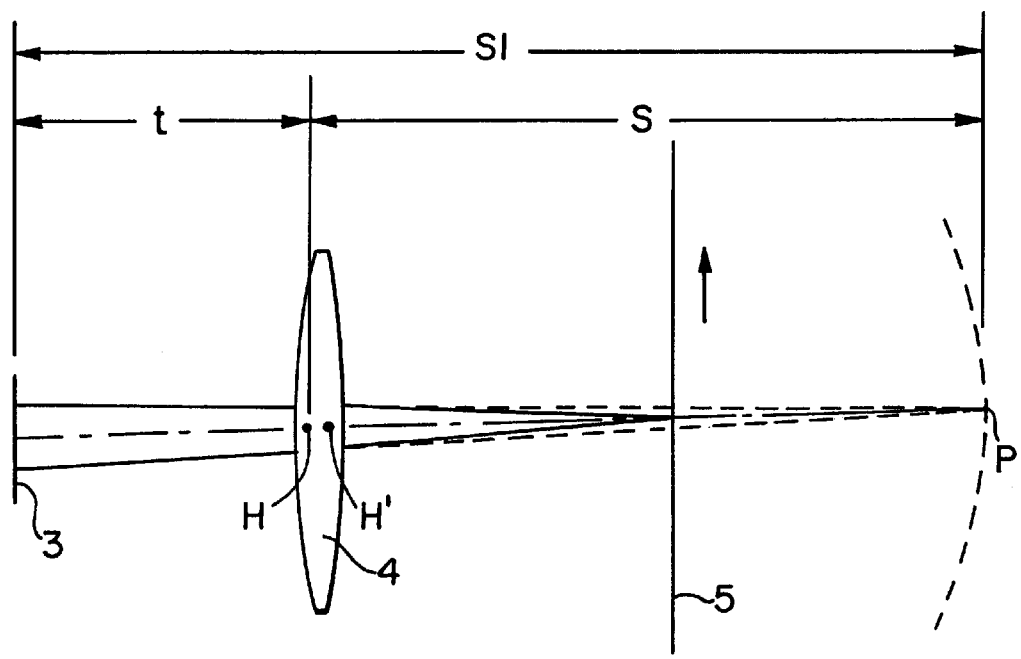
FIG. 2 is an upper view of a relevant portion of the scanning apparatus embodying the present invention.
Figure 3:
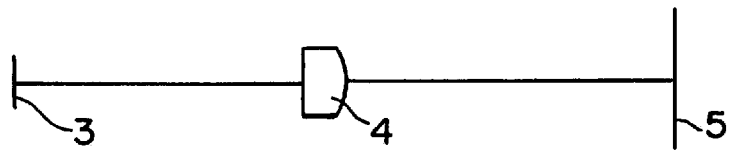
FIG. 3 is a side view of a relevant portion of the scanning apparatus embodying the present invention.

First to sixth implementations of the present invention will be described. In these implementations, as shown in FIGS. 2 and 3, the single fθ lens 4 is located between the deflecting surface of the deflector 3 and the scanned surface 5, and is bi-convex in the main scanning direction.

First Implementation

In the single fθ lens 4 used in the first implementation, main curves in the main scanning direction (curves along the lens surfaces which are parallel to the main scanning direction and pass the vertices) on its first and second surfaces form a circle. The curvatures of the first and second surfaces in the main scanning direction may be uniform on the entire surfaces. The surface configuration in the main scanning direction is made simple by this arrangement.

In the first implementation, the following conditions (1) to (3) are fulfilled.

$$0.7 \leq \frac{d_1}{d_3} \leq 1.3 \quad (1)$$

$$0.4 < \frac{|R_{1H}|}{|R_{2H}|} \quad (2)$$

$$-3.5 < \frac{nf_H}{t} + \frac{f_H}{S} \quad (3)$$

where $R_{1H}$ is a radius of curvature of the first surface of the single fθ lens 4 in the main scanning direction, $R_{2H}$ is a radius of curvature of the second surface of the single fθ lens 4 in the main scanning direction, $d_1$ is a distance between the deflecting surface (corresponding to an entrance pupil) of the deflector 3 and the first surface of the single fθ lens 4, $d_3$ is a distance between the second surface of the single fθ lens 4 and the scanned surface 5, n is a refractive index of the single fθ lens 4, $f_H$ is a focal length of the single fθ lens 4 in the main scanning direction, t is a distance from a front principal point H of the single fθ lens 4 to the deflecting surface of the deflector 3, and s is a distance from the front principal point H of the single fθ lens 4 to a point of natural convergence P of the convergent luminous flux (i.e. point of convergence of the convergent luminous flux when no lens 4 is provided).

The condition (1) is a condition for correcting field curvature in the main scanning direction and distortion. When $d_1$ is decreased to be smaller than $d_3$, negative distortion increases, so that convex field curvature in the main scanning direction (field curvature such that the image surface in the main scanning direction approaches the deflector as the angle of view in the main scanning direction increases) increases. When $d_1$ is increased to be greater than $d_3$, positive distortion increases, so that concave field curvature in the main scanning direction (field curvature such that the image surface in the main scanning direction approaches the scanned surface as the angle of view in the main scanning direction increases) increases. When the lower limit of the condition (1) is exceeded, negative distortion and convex field curvature in the main scanning direction cannot sufficiently be corrected. When the upper limit thereof is exceeded, positive distortion and concave field curvature in the main scanning direction cannot sufficiently be corrected.

The condition (2) is also a condition for correcting field curvature in the main scanning direction and distortion. When $d_1/d_3$ fulfills the condition (1), negative distortion is generated with a decrease in $R_{1H}$. Therefore, when the lower limit of the condition (2) is exceed, negative distortion cannot sufficiently be corrected.

The condition (3) is also for correcting field curvature in the main scanning direction and distortion. By fulfilling the condition (3), a low-refractive-index plastic material having a refractive index of 1.6 or lower, not to mention a high-refractive-index plastic material, may be used as the lens material.

When field curvature in the main scanning direction and distortion have excellently been corrected in the single fθ lens 4 of the first implementation, convex field curvature in the sub scanning direction (field curvature such that the image surface in the sub scanning direction approaches the deflector as the angle of view in the main scanning direction increases) is generated. When it is necessary to correct this field curvature, a deformed toric surface such that the radius of curvature in the sub scanning direction increases as the angle of view in the main scanning direction increases is used for at least one of the surfaces of the single fθ lens 4. Further, it is advantageous in processing the lens if one surface of the single fθ lens 4 is the deformed toric surface and the other surface is a spherical surface.

Second Implementation

In the single fθ lens 4 of the second implementation, main curves in the main scanning direction on its first and second surfaces form a circle. The curvatures of the first and second surfaces in the main scanning direction may be uniform on the entire surfaces. The surface configuration in the main scanning direction is made simple by this arrangement.

In the second implementation, the refractive index of the single fθ lens 4 is 1.6 or lower, and in addition to the aforementioned condition (1), the following condition (4) is fulfilled:

$$0.3 < \frac{d_3}{f_H} < 0.5 \quad (4)$$

The condition (4) is a condition for correcting distortion. When the lower limit of the condition (4) is exceeded, negative distortion is not sufficiently corrected. When the upper limit thereof is exceeded, positive distortion is not sufficiently corrected.

In the second implementation, like in the first implementation, when it is necessary to correct field curvature in the sub scanning direction, the deformed toric surface such that the radius of curvature in the sub scanning direction increases as the angle of view in the main scanning direction increases is used for at least one of the surfaces of the single fθ lens 4. Further, it is advantageous in processing the lens if one surface of the single fθ lens 4 is the deformed toric surface and the other surface is a spherical surface.

Third Implementation

The single fθ lens 4 of the third implementation is of a configuration such that a main curve in the main scanning direction on at least one surface thereof forms a curve such that the radius of curvature increases as the angle of view in the main scanning direction increases. It may be an fθ lens of a configuration such that the curvature of at least one surface in the main scanning direction decreases on the entire surface as the angle of view in the main scanning direction increases. These configurations may be provided to one or both of the first and second lens surfaces of the single fθ lens 4. With these configurations, when the single fθ lens 4 is arranged at a position where $d_1$ is smaller than $d_3$, i.e. when the distance between the lens 4 and the deflector 3 is shorter than the distance between the lens 4 and the scanned surface 5, field curvature in the main scanning direction and distortion are excellently corrected. That is, when $d_1$ is decreased to be smaller than $d_3$, negative distortion increases, so that convex field curvature in the main scanning direction increases. When, to correct this, the focal length of the single fθ lens 4 is increased by increasing the radius of curvature of the single fθ lens 4 in the main scanning direction, although distortion can be corrected, field curvature in the main scanning direction cannot be corrected. For this reason, the single fθ lens 4 is designed so that the main scanning direction field curvature of at least one surface thereof is a curve such that the radius of curvature increases as the angle of view in the main scanning direction increases, thereby decreasing the refractive power with an increase in angle of view in the main scanning direction to shift the image surface toward the plus side.

In the third implementation, the following conditions (5) and (6) are fulfilled:

$$0.5 \leq \frac{d_1}{d_3} \leq 1.0 \quad (5)$$

$$-3.5 < \frac{nf_H}{t} + \frac{f_H}{s} \quad (6)$$

The condition (5) is a condition for correcting field curvature in the main scanning direction. The upper limit thereof indicates the precondition that the single fθ lens 4 is arranged at a position where $d_1$ is smaller than $d_3$. When the lower limit of the condition (5) is exceeded, field curvature in the main scanning direction cannot sufficiently be corrected.

The condition (6) is a condition for correcting field curvature in the main scanning direction and distortion. By fulfilling the condition (6), a low-refractive-index plastic material having a refractive power of 1.6 or lower may be used as the lens material.

To more excellently correct field curvature in the main scanning direction and distortion, the following condition (7) is preferably fulfilled:

$$0.6 < \frac{|R_{1H}|}{|R_{2H}|} < 0.8 \quad (7)$$

When the lower limit of the condition (7) is exceeded, negative distortion increases. When the upper limit thereof is exceeded, negative distortion increases and convex field curvature is undercorrected.

In the third implementation, like in the above-described implementations, when it is necessary to correct field curvature in the sub scanning direction, deformed toric surface such that the radius of curvature in the sub scanning direction increases as the angle of view in the main scanning direction increases is used format least one of the surfaces of the single fθ lens 4. Further, it is advantageous in processing the lens if one surface of the single fθ lens 4 is the deformed toric surface and the other surface is a spherical surface.

Fourth Implementation

Like in the third implementation, the single fθ lens 4 of the fourth implementation is of a configuration such that a main curve in the main scanning direction on at least one surface thereof forms a curve such that the radius of curvature increases as the angle of view in the main scanning direction increases. It may be an fθ lens of a configuration such that the curvature of at least one surface in the main scanning direction decreases on the entire surface as the angle of view in the main scanning direction increases. These configurations may be provided to one or both of the first and second lens surfaces of the single fθ lens 4.

In the fourth implementation, the refractive index of the single fθ lens 4 is 1.6 or lower, and in addition to the aforementioned condition (5) explained in the above description of the third implementation, the following condition (8) is fulfilled:

$$0.3 < \frac{d_3}{f_H} < 0.5 \quad (8)$$

The condition (8) is a condition for correcting distortion. When the lower limit of the condition (8) is exceeded, negative distortion cannot sufficiently be corrected. When the upper limit thereof is exceeded, positive distortion cannot sufficiently be corrected.

The configuration of the single fθ lens 4 of the fourth implementation is simplified by providing the lens 4 with a spherical first surface, and an aspherical second surface of a configuration such that the radius of curvature in the main scanning direction increases as the angle of view in the main scanning direction increases.

In the fourth implementation, like in the third implementation, the condition (7) is preferably fulfilled to more excellently correct field curvature in the main scanning direction and distortion.

Further, in the fourth implementation, like in the above-described implementations, when it is necessary to correct field curvature in the sub scanning direction, the deformed toric surface such that the radius of curvature in the sub scanning direction increases as the angle of view in the main scanning direction increases is used for at least one of the surfaces of the single fθ lens 4. Further, it is advantageous in processing the lens if one surface of the single fθ lens 4 is the deformed toric surface and the other surface is a spherical surface.

Fifth Implementation

In the single fθ lens 4 of the fifth implementation, a main curve in the main scanning direction on at least one surface thereof forms a curve such that the radius of curvature decreases as the angle of view in the main scanning direction increases. It may be an fθ lens of a configuration such that the curvature of at least one surface in the main scanning direction increases on the entire surface as the angle of view in the main scanning direction increases. These configurations may be provided to one or both of the first and second lens surfaces of the single fθ lens 4. With these configurations, when the single fθ lens 4 is arranged at a position where $d_1$ is greater than $d_3$, i.e. the distance between the lens 4 and the scanned surface 5 is shorter than the distance between the lens 4 and the deflector 3, field curvature in the main scanning direction and distortion are excellently corrected. That is, when $d_1$ is increased to be greater than $d_3$, positive distortion increases, so that concave field curvature in the main scanning direction increases. When, to correct this, the focal length of the single fθ lens 4 is decreased by decreasing the radius of curvature of the single fθ lens 4 in the main scanning direction, although distortion can be corrected, field curvature in the main scanning direction cannot be corrected. For this reason, the single fθ lens 4 is designed so that the main scanning direction field curvature of at least one surface thereof is a curve such that the radius of curvature decreases as the angle of view in the main scanning direction increases, thereby increasing the refractive power with an increase in angle of view in the main scanning direction to shift the image surface toward the minus side.

In the fifth implementation, the following conditions (9) and (10) are fulfilled:

$$1.0 \leq \frac{d_1}{d_3} \leq 2.0 \qquad (9)$$

$$-3.5 < \frac{nf_H}{t} + \frac{f_H}{s} \qquad (10)$$

The condition (9) is a condition for correcting field curvature in the main scanning direction. The lower limit thereof indicates the precondition that the single fθ lens 4 is arranged at a position where $d_1$ is greater than $d_3$. When the upper limit of the condition (9) is exceeded, field curvature in the main scanning direction cannot sufficiently be corrected.

The condition (10) is a condition for correcting field curvature in the main scanning direction and distortion. By fulfilling the condition (10), a low-refractive-index plastic material having a refractive power of 1.6 or lower may be used as the lens material.

To more excellently correct field curvature in the main scanning direction and distortion, the following condition (11) is preferably fulfilled:

$$0.6 < \frac{|R_{1H}|}{|R_{2H}|} < 0.8 \qquad (11)$$

When the lower limit of the condition (11) is exceeded, negative distortion increases. When the upper limit thereof is exceeded, negative distortion increases and convex field curvature is undercorrected.

In the fifth implementation, like in the above-described implementations, when it is necessary to correct field curvature in the sub scanning direction, the deformed toric surface such that the radius of curvature in the sub scanning direction increases as the angle of view in the main scanning direction a increases is used for at least one of the surfaces of the single fθ lens 4. Further, it is advantageous in processing the lens if one surface of the single fθ lens 4 is the deformed toric surface and the other surface is a spherical surface.

Sixth Implementation

Like in the fifth implementation, the single fθ lens 4 of the sixth implementation is of a configuration such that a main curve in the main scanning direction on at least one surface thereof forms a curve such that the radius of curvature decreases as the angle of view in the main scanning direction increases. It may bean θ lens of a configuration such that the curvature of at least one surface in the main scanning direction increases on the entire surface as the angle of view in the main scanning direction increases. These configurations may be provided to one or both of the first and second lens surfaces of the single fθ lens 4.

In the sixth implementation, the refractive index of the single fθ lens 4 is 1.6 or lower, and in addition to the aforementioned condition (9) explained in the description of the fifth implementation, the following condition (12) is fulfilled:

$$0.3 < \frac{d_3}{f_H} < 0.5 \qquad (12)$$

The condition (12) is a condition for correcting distortion. When the lower limit of the condition (12) is exceeded, negative distortion cannot sufficiently be corrected. When the upper limit thereof is exceeded, positive distortion cannot sufficiently be corrected.

The configuration of the single fθ lens 4 of the sixth implementation is simplified by providing the lens 4 with a spherical first surface, and an aspharical second surface of a configuration such that the radius of curvature in the main scanning direction decreases as the angle of view in the main scanning direction increases.

In the sixth implementation, like in the fifth implementation, to more excellently correct field curvature in the main scanning direction and distortion, the condition (11) is preferably fulfilled.

Further, in the sixth implementation, like in the above-described implementations, when it is necessary to correct field curvature in the sub scanning direction, the deformed toric surface such that the radius of curvature in the sub scanning direction increases as the angle of view in the main scanning direction increases is used for at least one of the surfaces of the single fθ lens 4. Further, it is advantageous in processing the lens if one surface of the single fθ lens 4 is the deformed toric surface and the other surface is a spherical surface.

Hereinafter, first to eighth specific embodiments will be described. Data of these embodiments are shown in Tables 1 to 16.

In the tables, $d_1$ is a distance between the deflecting surface of the deflector 3 and the first surface of the single fθ lens 4, $d_2$ is a distance between the first and second surfaces of the single fθ lens 4, $d_3$ is a distance between the second surface of the single fθ lens 4 and the scanned surface 5, $R_{1H}$ is an axial radius of curvature of the first surface of the single fθ lens 4 in the main scanning direction, $R_{2H}$ is an axial radius of curvature of the second surface of the single fθ lens 4 in the main scanning direction, $R_{1G}$ is an axial radius of curvature of the first surface of the single fθ lens 4 in the sub scanning direction, $R_{2G}$ is an axial radius of curvature of the second surface of the single fθ lens 4 in the sub scanning direction, n is a refractive index of the single fθ lens 4, $f_H$ is a focal length of the single fθ lens 4 in the main scanning direction, t is a distance from the front principal point H of the single fθ lens 4 to the deflecting surface of the deflector 3, s is a distance from the front principal point H of the single fθ lens 4 to the point of natural convergence P of the convergent luminous flux, and $s_1$ is a distance from the deflecting surface of the deflector 3 to the point of natural convergence P of the convergent luminous flux.

When an aspherical surface (including the deformed toric surface) is used for the surface of the single fθ lens 4, the configuration of the aspherical surface is defined by the following equation (see FIG. 4):

$$x = \frac{ky^2}{1+(1-k^2y^2)^{\frac{1}{2}}} + \rho + A$$

$$\text{wherein } k = \frac{\kappa}{4-\kappa c}$$

$$\rho = \frac{cz^2}{1+(1-c^2z^2)^{\frac{1}{2}}}$$

$$A = a_{22}y^2z^2 + a_{04}y^4 + a_{24}y^2z^4$$

where x is a coordinate along the optical axis from the vertex, y is a coordinate in the main scanning direction from the vertex, z is a coordinate in the sub scanning direction from the vertex, 1/c is a radius of curvature of profile curve (axial radius of curvature in the sub scanning direction), 1/K is a radius of curvature of main curve vertex (axial radius of curvature in the main scanning direction), and $a_{22}$, $a_{04}$ and $a_{24}$ are aspherical coefficients.

The first embodiment corresponds to the first and second implementations. In the first embodiment, the first surface of the single fθ lens 4 is a spherical surface, and the second surface is a deformed toric surface. Data of this embodiment are shown in Table 1. The radii of curvature in the sub scanning direction with respect to the angles of view (deg.) in the main scanning direction are shown in Table 2. The aberrations of the first embodiment are shown in FIGS. 5A and 5B. In the figures showing the aberrations, the lateral axis represents the angle of view (deg.).

Figure 6A:
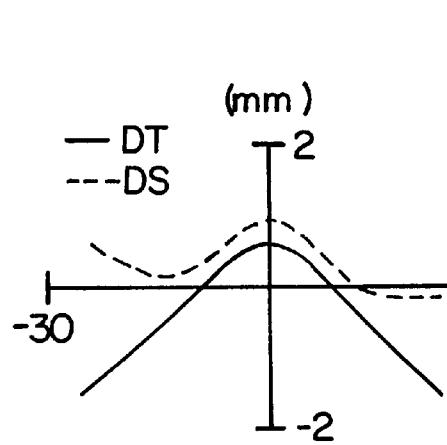
FIGS. 6A and 6B show aberration curves of a second embodiment of the present invention.
Figure 6B:
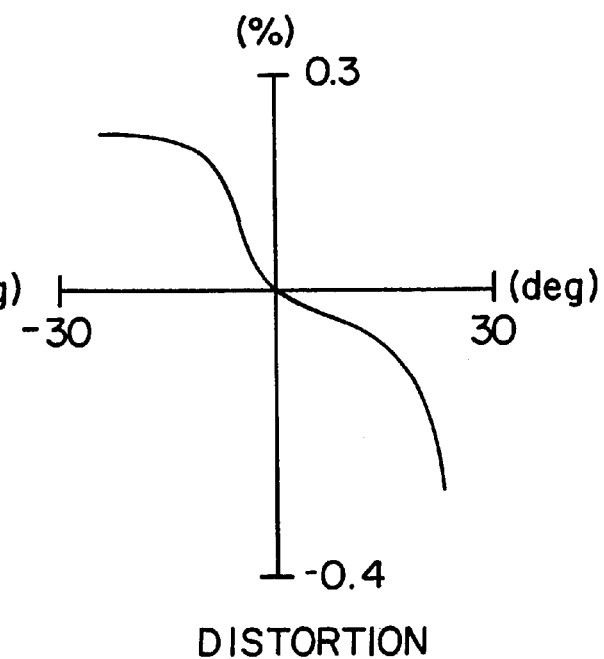

The second embodiment corresponds to the first and second implementations. In the second embodiment, the first surface of the single fθ lens 4 is a spherical surface, and the second surface is a deformed toric surface. Data of this embodiment are shown in Table 3. The radii of curvature of the deformed toric surface in the sub scanning direction with respect to the angles of view (deg.) in the main scanning direction are shown in Table 4. The aberrations of the second embodiment are shown in FIGS. 6A and 6B.

Figure 7A:
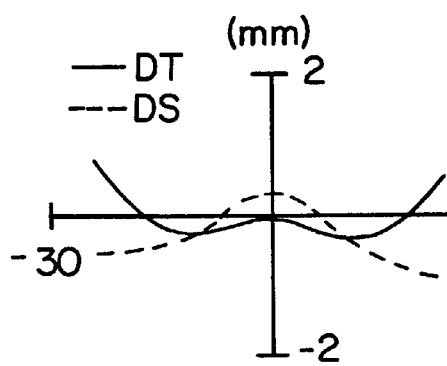
FIGS. 7A and 7B show aberration curves of a third embodiment of the present invention.
Figure 7B:
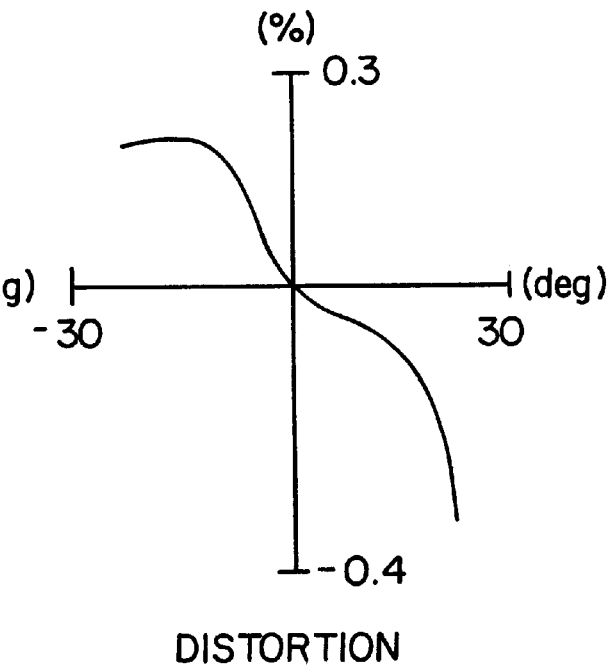

The third embodiment corresponds to the first and second implementations. In the third embodiment, the first surface of the single fθ lens 4 is a spherical surface, and the second surface is a deformed toric surface. Data of this embodiment are shown in Table 5. The radii of curvature of the deformed toric surface in the sub scanning direction with respect to the angles of view (deg.) in the main scanning direction are shown in Table 6. The aberrations of the third embodiment are shown in FIGS. 7A and 7B.

The fourth embodiment corresponds to the first and second implementations. In the fourth embodiment, the first surface of the single fθ lens 4 is a spherical surface, and the second surface is a deformed toric surface. Data of this embodiment are shown in Table 7. The radii of curvature in the sub scanning direction with respect to the angle of view (deg.) in the main scanning direction are shown in Table 8. The aberrations of the fourth embodiment are shown in FIGS. 8A and 8B.

The fifth embodiment corresponds to the third and fourth implementations. In the fifth embodiment, the first surface of the single fθ lens 4 is a spherical surface, and the second surface is a deformed toric surface. The curvature of the main curve of the second surface in the main scanning direction varies according to the angle of view in the main scanning direction. Data of this embodiment are shown in Table 9. The radii of curvature of the deformed toric surface in the sub scanning direction with respect to the angles of view (deg.) in the main scanning direction are shown in Table 10. The aberrations of the fifth embodiment are shown in FIGS. 9A and 9B.

Figure 10A:
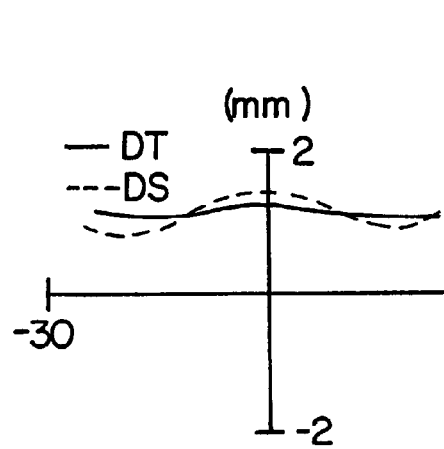
FIGS. 10A and 10B show aberration curves of a sixth embodiment of the present invention.
Figure 10B:
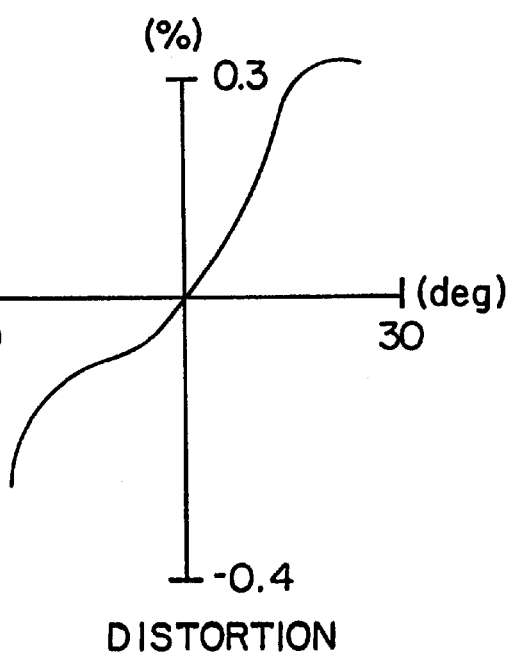

The sixth embodiments corresponds to the fifth and sixth implementations. In the sixth embodiment, the first surface of the single fθ lens 4 is a spherical surface, and the second surface is a deformed toric surface. The curvature of the main curve of the second surface in the main scanning directions varies according to the angle of view in the main scanning direction. Data of this embodiment are shown in Table 11. The radii of curvature of the deformed toric surface in the sub scanning direction with respect to the angles of view (deg.) in the main scanning direction are shown in Table 12. The aberrations of the sixth embodiment are shown in FIGS. 10A and 10B.

Figure 11A:
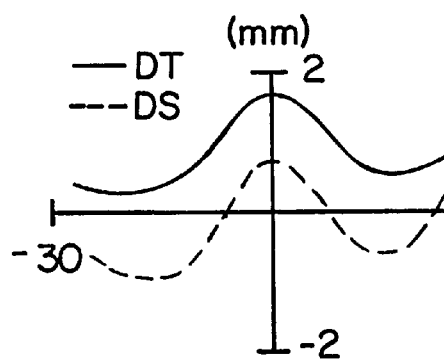
FIGS. 11A and 11B show aberration curves of a seventh embodiment of the present invention.
Figure 11B:
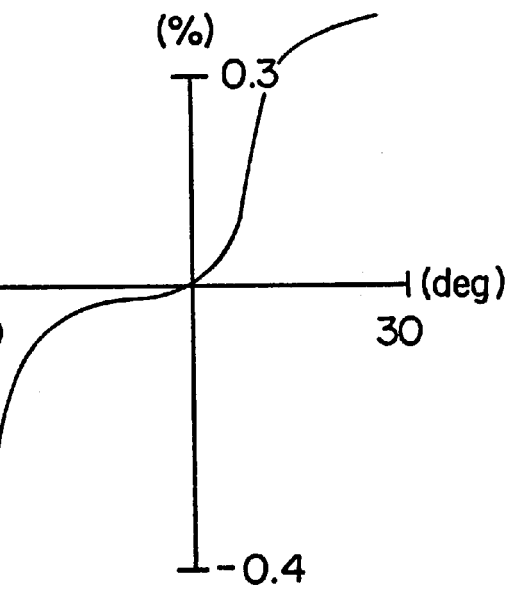

The seventh embodiment corresponds to the third and fourth implementations. In the seventh embodiment, the first surface of the single fθ lens 4 is a spherical surface, and the second surface is a deformed toric surface. The curvature of the main curve of the second surface in the main scanning direction varies according to the angle of view in the main scanning direction. Data of t his embodiment are shown in Table 13. The radii of curvature of the deformed toric surface in the sub scanning direction with respect to the angles of view (deg.) in the main scanning direction are shown in Table 14. The aberrations of the seventh embodiment are shown in FIGS. 11A and 11B.

Figure 12A:
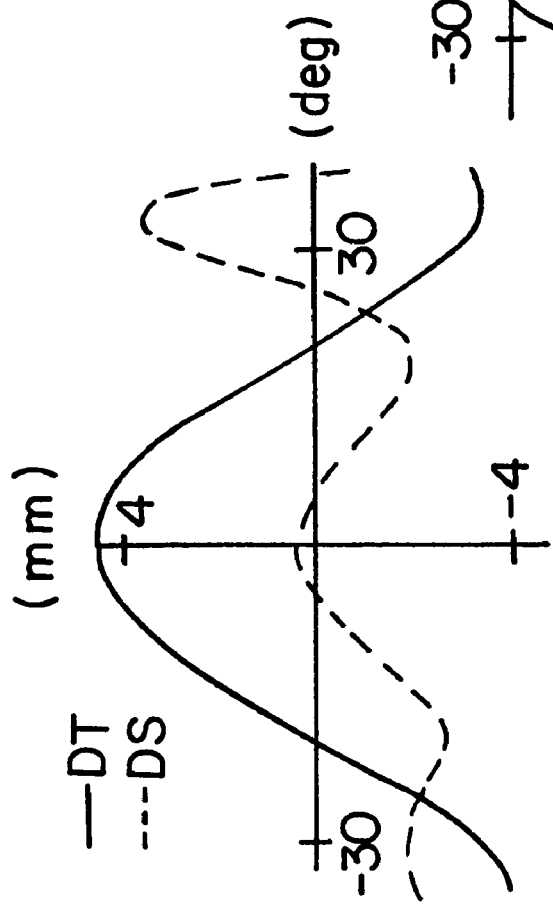
FIGS. 12A and 12B show aberration curves of an eighth embodiment of the present invention.
Figure 12B:
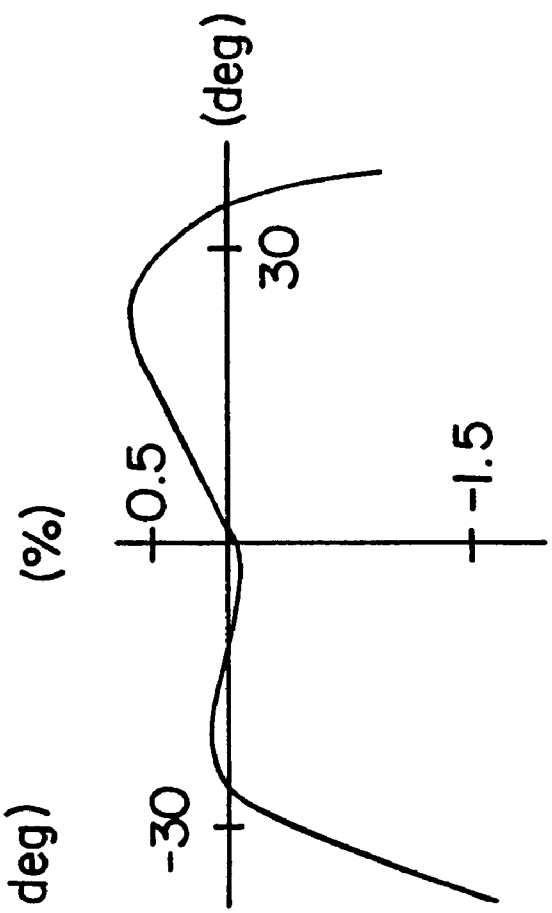

The eighth embodiment corresponds to the second implementation. In the eighth embodiment, the first surface of the single fθ lens 4 is a spherical surface, and the second surface is a deformed toric surface. Data of this embodiment are shown in Table 15. The radii of curvature in the sub scanning direction with respect to the angles of view (deg.) in the main scanning direction are shown in Table 16. The aberrations of the eighth embodiment are shown in FIGS. 12A and 12B.

As is clear from the above description, according to the first to eighth embodiments, a scanning apparatus is provided where field curvature in the main scanning direction and distortion are excellently corrected. Further, the surface configuration of the single fθ lens is simple and advantageous in processing.

Next, ninth to sixteenth embodiments of the present invention will be described.

Figure 13:
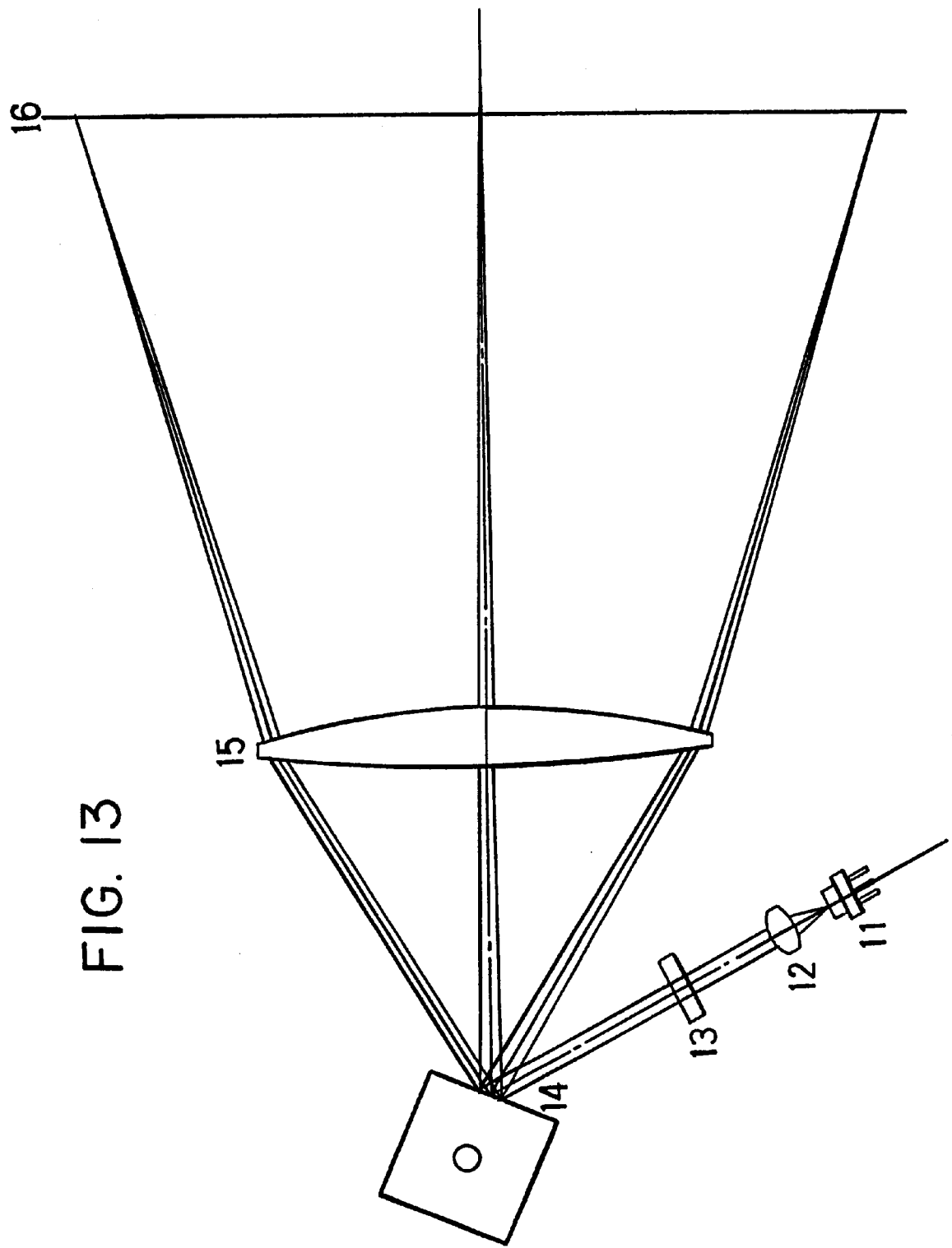
FIG. 13 shows the arrangement of a scanning optical system of ninth and tenth embodiments of the present invention.
Figure 14:
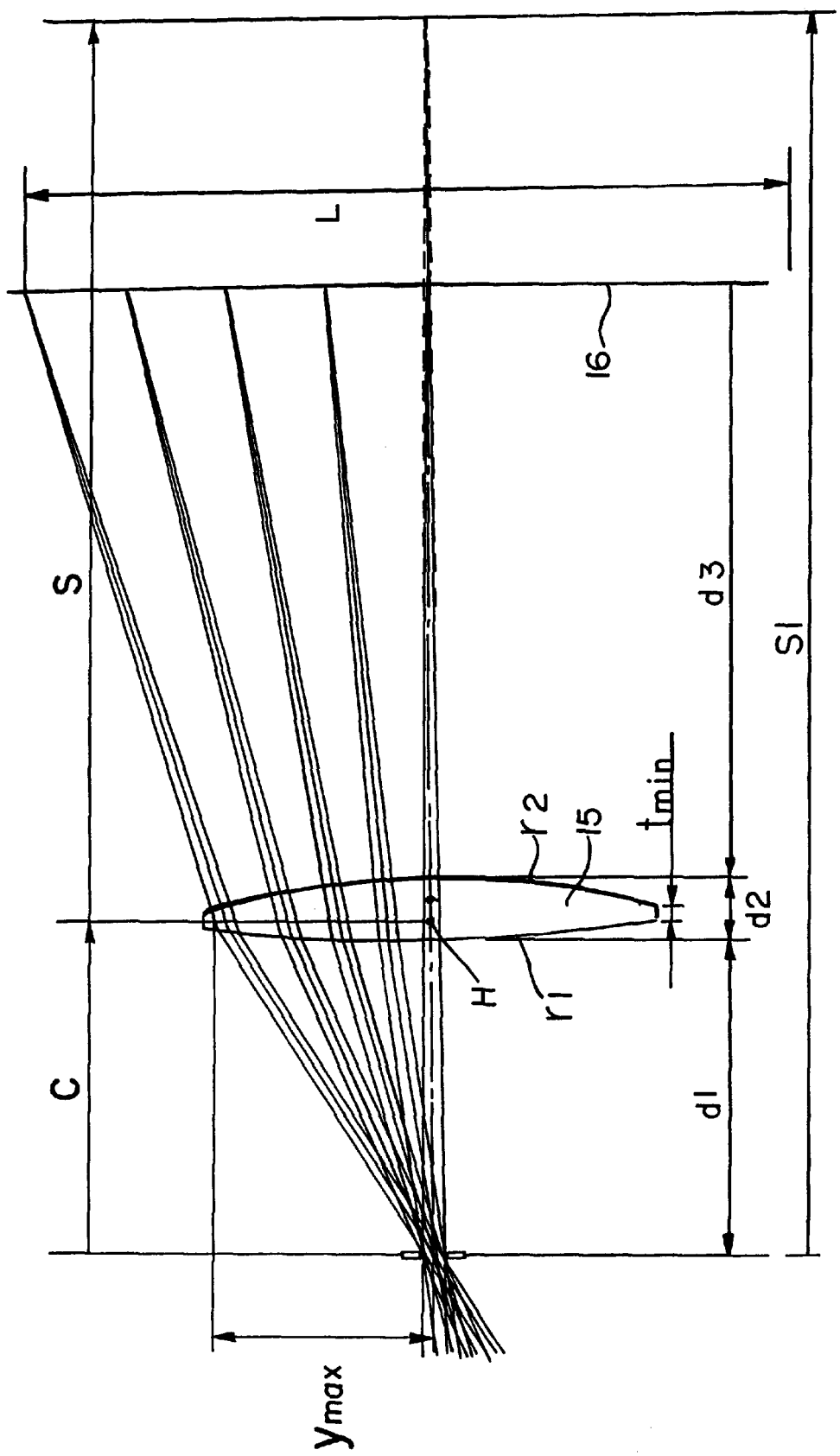
FIG. 14 shows the configuration and arrangement of a scanning lens of the ninth and tenth embodiments of the present invention.
Figure 15A:
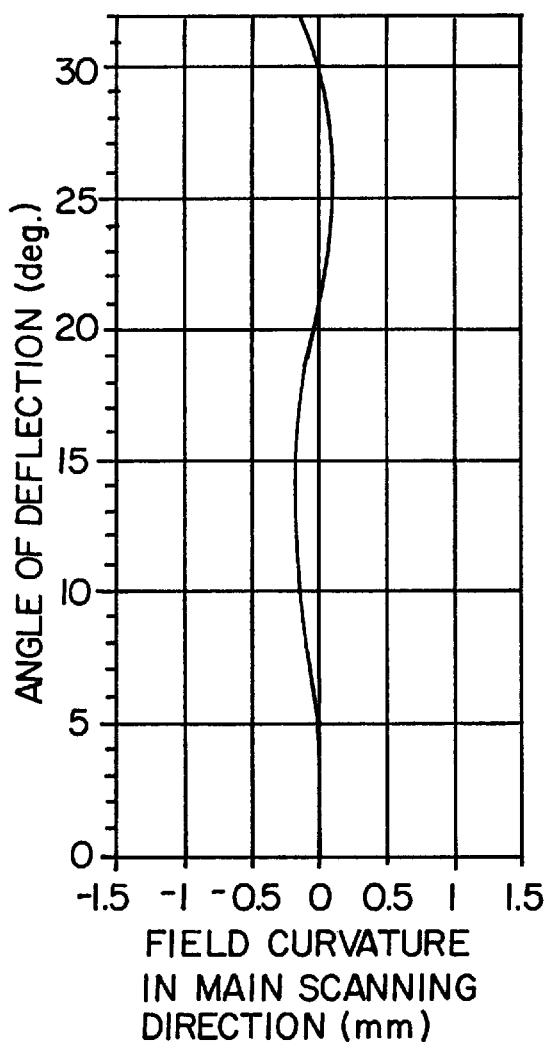
FIGS. 15A and 15B show aberration curves of the scanning lens of the ninth embodiment of the present invention.
Figure 15B:
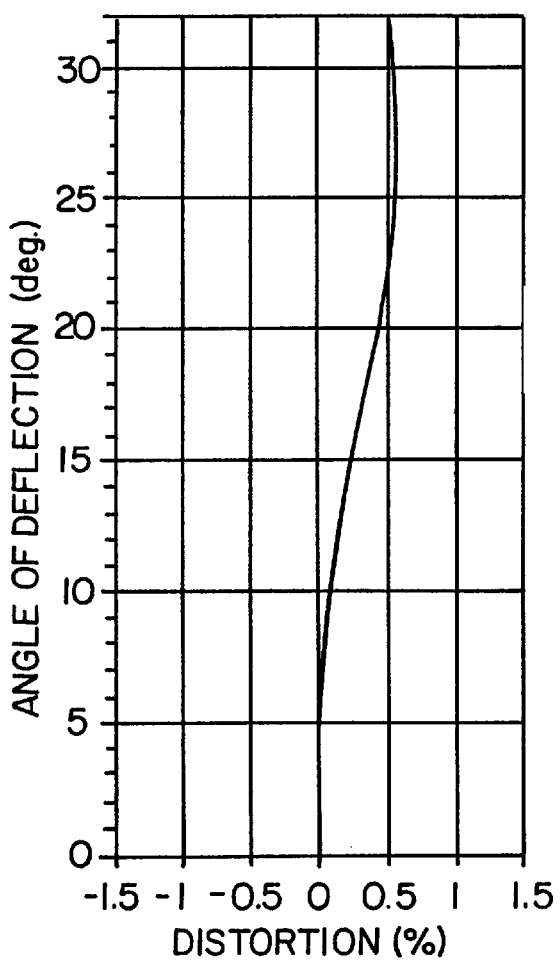
Figure 16:
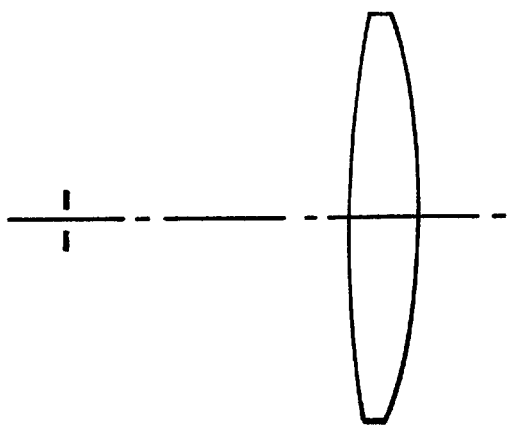
FIG. 16 shows the configuration of the scanning lens of the ninth embodiment of the present invention.
Figure 17A:
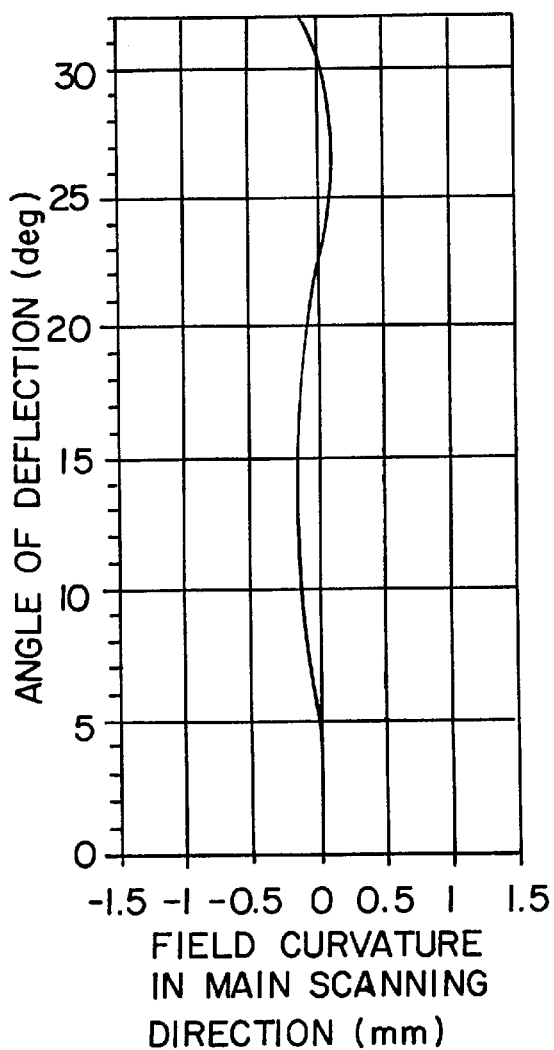
FIGS. 17A and 17B show aberration curves of the scanning lens of the tenth embodiment of the present invention.
Figure 17B:
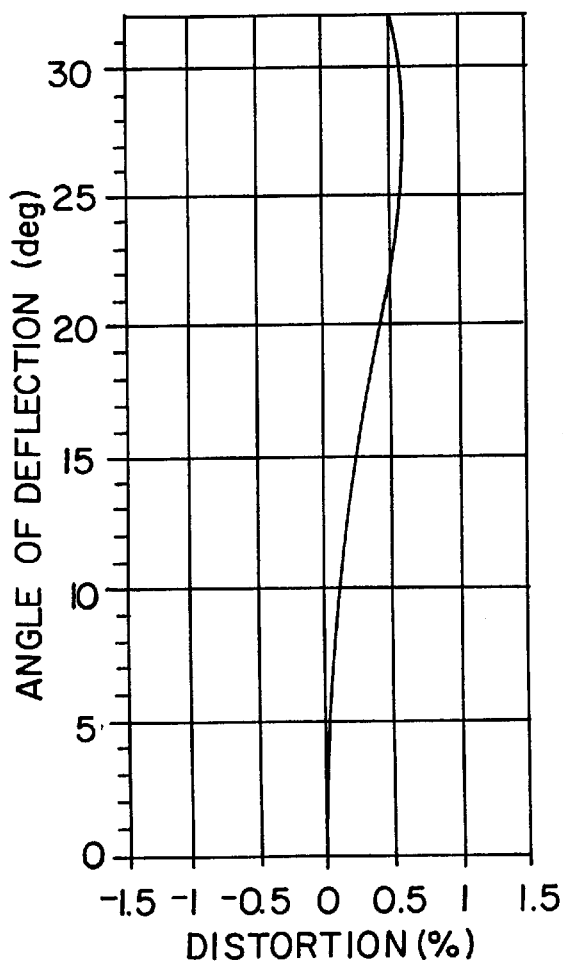
Figure 18:
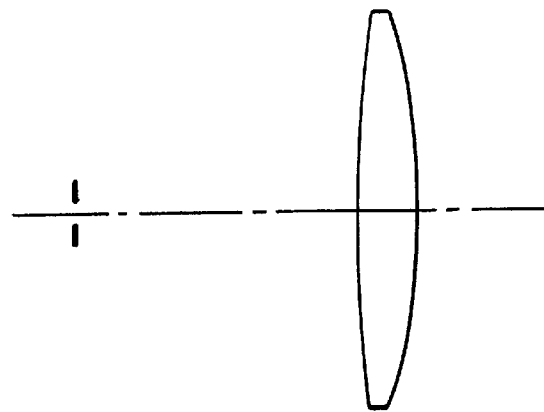
FIG. 18 shows the configuration of the scanning lens of the tenth embodiment of the present invention.
Figure 19:
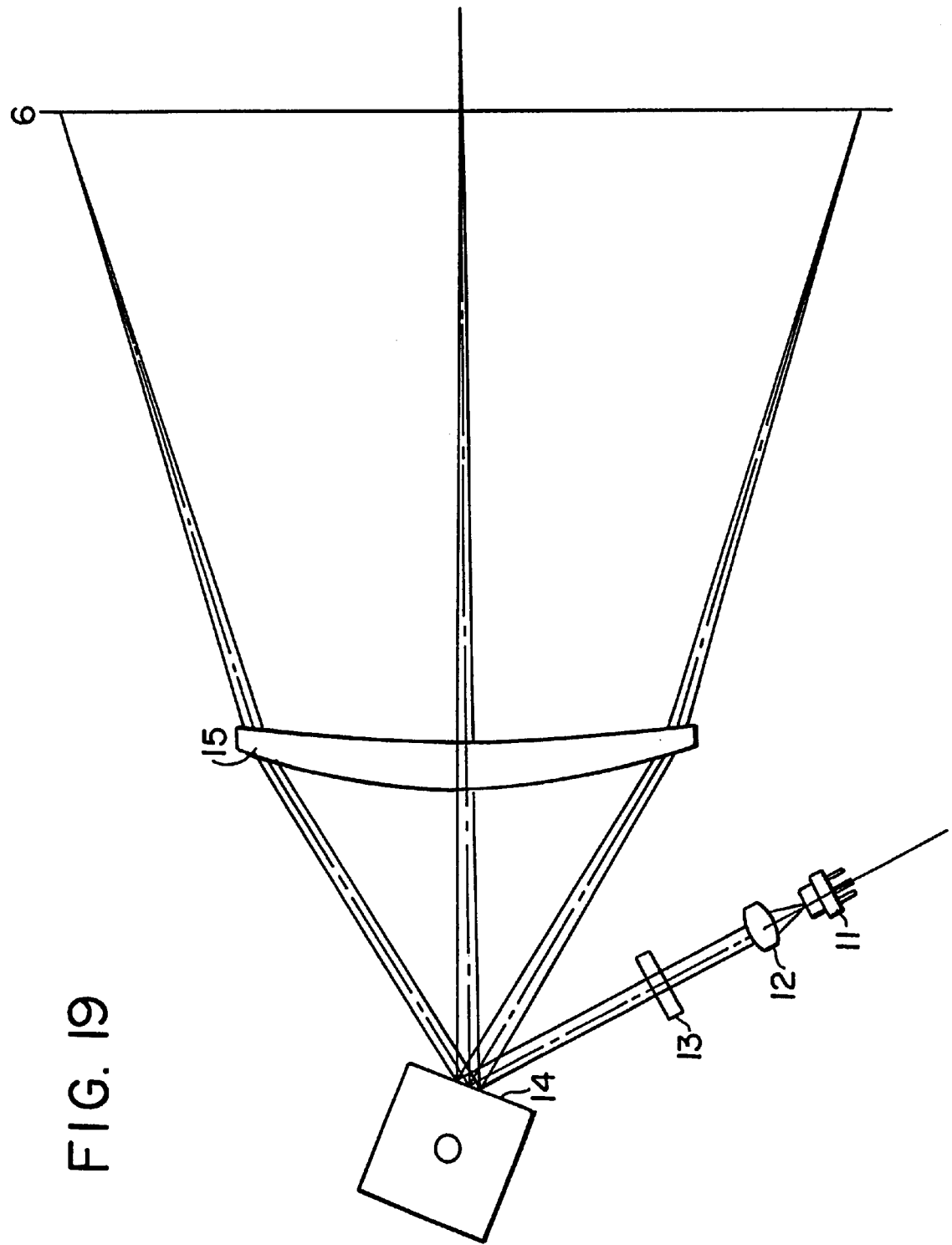
FIG. 19 shows the arrangement of a scanning optical system of eleventh to sixteenth embodiments of the present invention.

FIGS. 13 and 19 show the arrangements of scanning optical systems embodying the present invention. Reference numeral 11 is a light source including light emitting diodes such as a laser diode (LD) and a light emitting diode (LED). The light source 11 emits a divergent luminous flux. Reference numeral 12 is a collimator lens which converges the divergent luminous flux from the light source 11. Reference numeral 13 is a cylindrical lens which converges the converged luminous flux into a linear form. Reference numeral 14 is a polygonal mirror which rotates to deflect the linearly converged luminous flux in order to perform scanning.

The luminous flux deflected at a uniform angular velocity by the polygonal mirror 14 passes through a scanning lens 15 and is directed to a scanned surface 16 to form an image. At this time, the scanning lens 15 works so that the luminous flux deflected by the polygonal mirror 14 at a uniform angular velocity scans the scanned surface 16 substantially at a uniform velocity.

The ninth and tenth embodiments will be described. As shown in FIGS. 1 and 2, the scanning lens 15 of the ninth and tenth embodiments is located between the polygonal mirror 14 and the scanned surface 16. The scanning lens 15 is bi-convex in the main scanning direction. A first surface $r_1$ facing to the polygonal mirror 14 is spherical, and a second surface $r_2$ facing to the scanned surface 16 is aspherical. Thus, the scanning lens 15 is of a simple configuration which is easy to process. Moreover, as indicated by subsequently-described conditions (15) and (18), the scanning lens 15 is arranged so that an axial distance $d_1$ between the deflecting surface of the polygonal mirror 14 and the first surface $r_1$ of the scanning lens 15 is shorter than an axial distance $d_3$ between the second surface $r_2$ of the scanning lens 15 and the scanned surface 16. This arrangement reduces the size of the scanning optical system, which results in a reduction in size of the print head.

The scanning lens 5 of the ninth and tenth embodiments is a single bi-convex lens of a configuration such that a main curve (curve along the lens surface which is parallel to the main scanning direction and passes the vertex) of the first surface $r_1$ in the main scanning direction forms a circle. The main curve of the second surface $r_2$ in the main scanning direction forms a curve such that the radius of curvature in the main scanning direction increases as the angle of view in the main scanning direction increases. By providing the scanning lens 15 with such a configuration, field of curvature in the main scanning direction and distortion are excellently corrected even when the scanning lens 15 is arranged so that the distance between the scanning lens 15 and the polygonal mirror 14 is shorter than the distance between the scanning lens 15 and the scanned surface 16. The scanning lens 15 of these embodiments which is made of a resin having a refractive index of 1.6 or lower is inferior to a scanning lens made of glass in uniformity of the physical characteristics inside the lens and in accuracy of the lens surface. To solve this problem, in the scanning lens 15, an axial distance $d_2$ of the lens is 25 mm or shorter and a thickness $t_{min}$ of the lens in the vicinity of the maximum angle of deflection is 4 mm or greater to thereby decrease the thickness ratio (the ratio between the thickness $t_{min}$ and an axial thickness $d_2$ of the lens) of the scanning lens 15. The thickness ratio ($d_2/t_{min}$) is preferably 4 or lower.

Further, the scanning optical system of the ninth and tenth embodiments fulfills the following conditions (13) to (15):

$$-5 < \frac{-nf}{c} + \frac{f}{s} < -2 \quad (13)$$

$$-0.41 < \frac{-c}{fH} < -0.25 \quad (14)$$

$$\frac{d_1}{d_3} < 1 \quad (15)$$

In the above conditions, n is a refractive index of the scanning lens 15, f is a focal length of the scanning lens 15, $d_1$ is the axial distance between the deflecting surface of the polygonal mirror 14 and the first surface $r_1$ of the scanning lens 15, $d_3$ is the axial distance between the second surface $r_2$ of the scanning lens 15 and the scanned surface 16, c is a distance from the deflecting surface of the polygonal mirror 14 to a front principal point H of the scanning lens 15, and s is a distance from the front principal point H of the scanning lens 15 to a point of natural convergence (point of convergence of the convergent luminous flux when no scanning lens 15 is provided) of the convergent luminous flux.

When the upper and lower limits of the condition (13) are exceeded, field curvature cannot be corrected even if the aspherical surface configuration of the second surface $r_2$ is changed. When the upper and lower limits of the condition (14) are exceeded, it is difficult to correct distortion in the scanning lens 15 having a low refractive index and a low thickness ratio.

Figure 20:
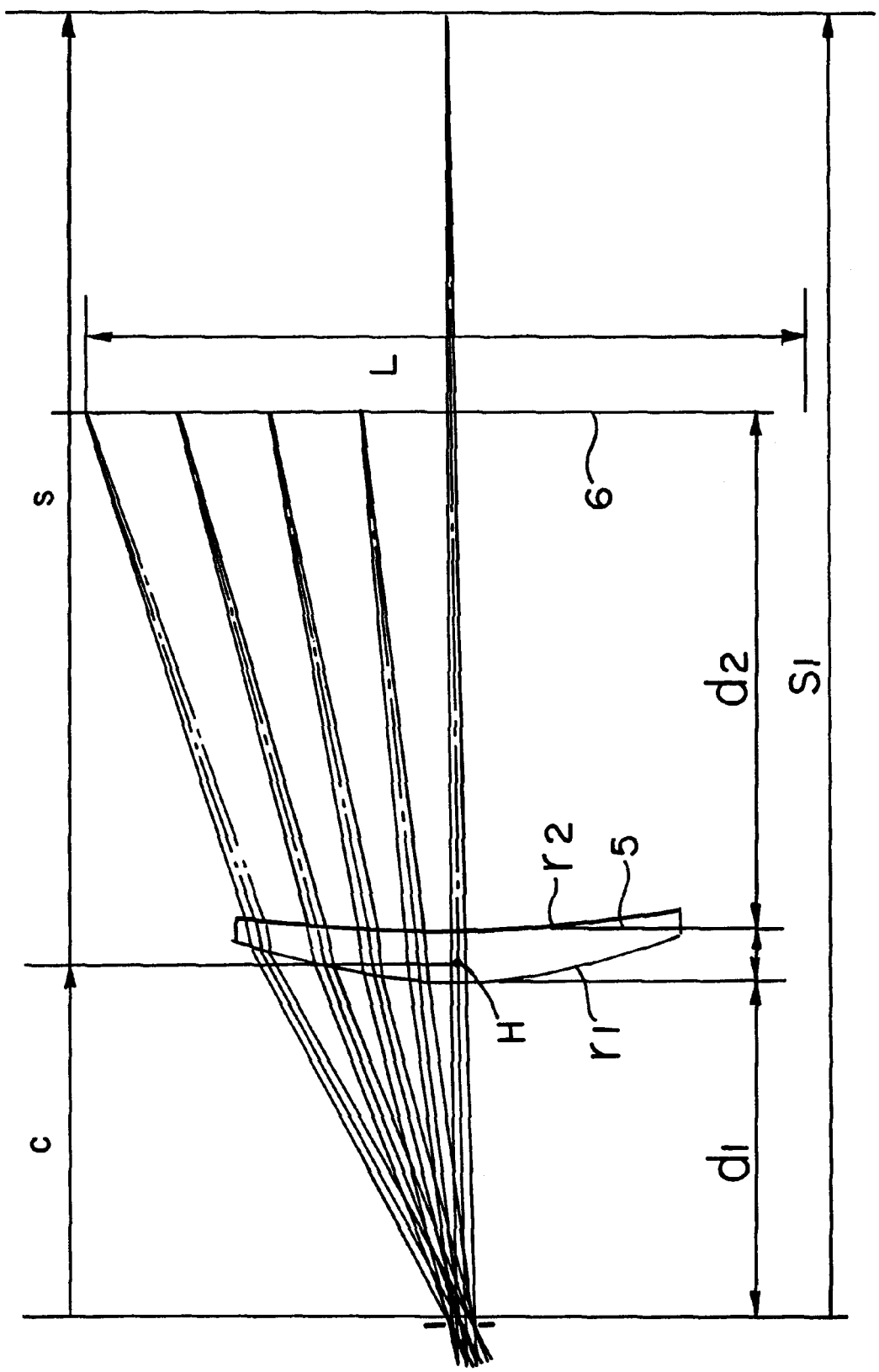
FIG. 20 shows the configuration and arrangement of a scanning lens of the eleventh to sixteenth embodiments of the present invention.
Figure 21A:
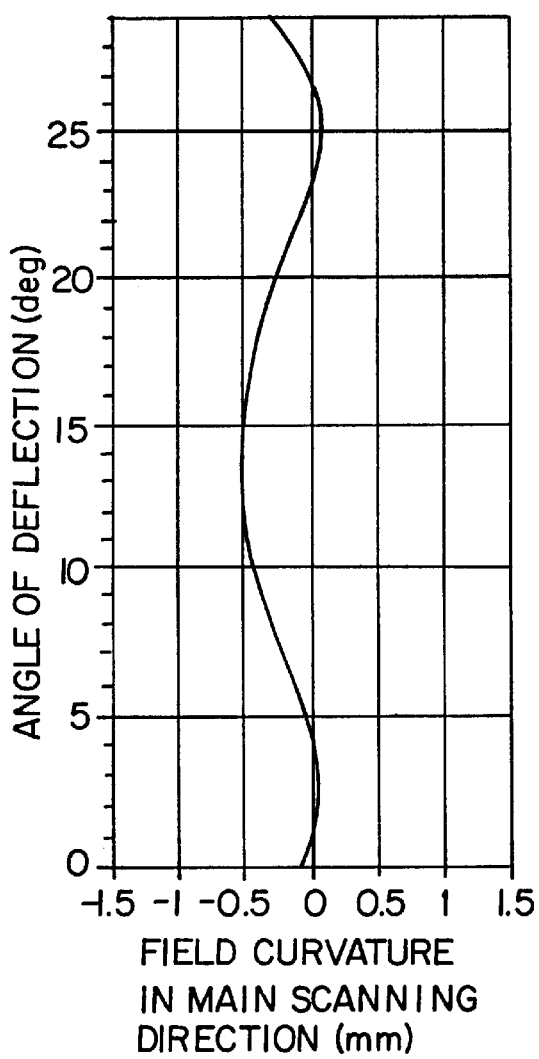
FIGS. 21A and 21B show aberration curves of the scanning lens of the eleventh embodiment of the present invention.
Figure 21B:
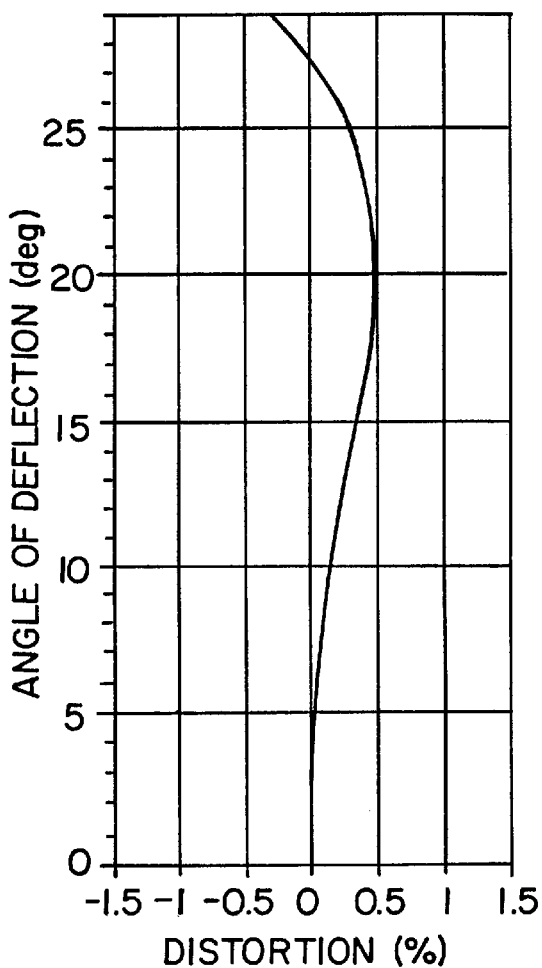
Figure 22:
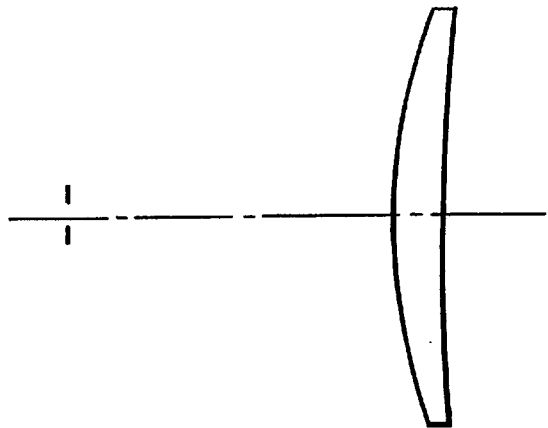
FIG. 22 shows the configuration of the scanning lens of the eleventh embodiment of the present invention.
Figure 23A:
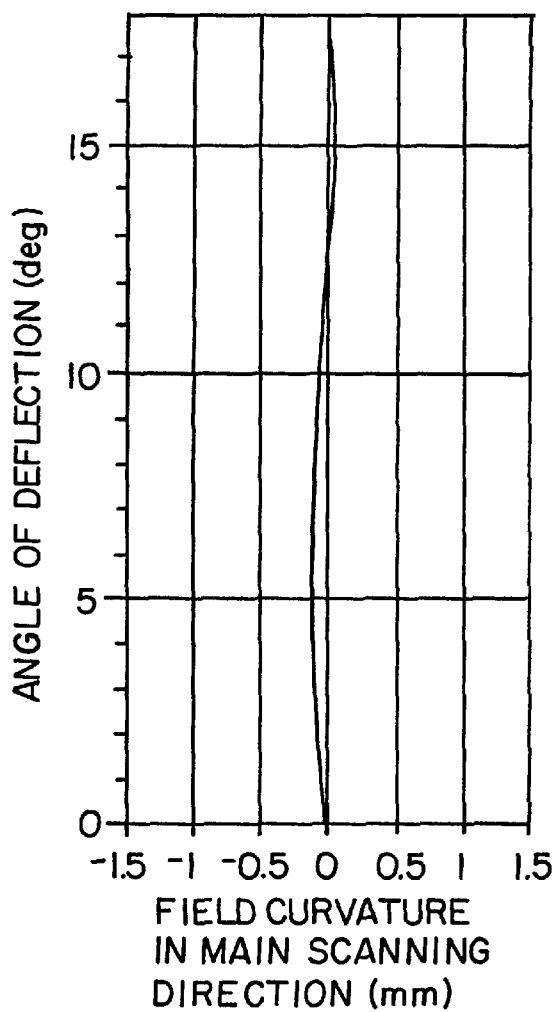
FIGS. 23A and 23B show aberration curves of the scanning lens of the twelfth embodiment of the present invention.
Figure 23B:
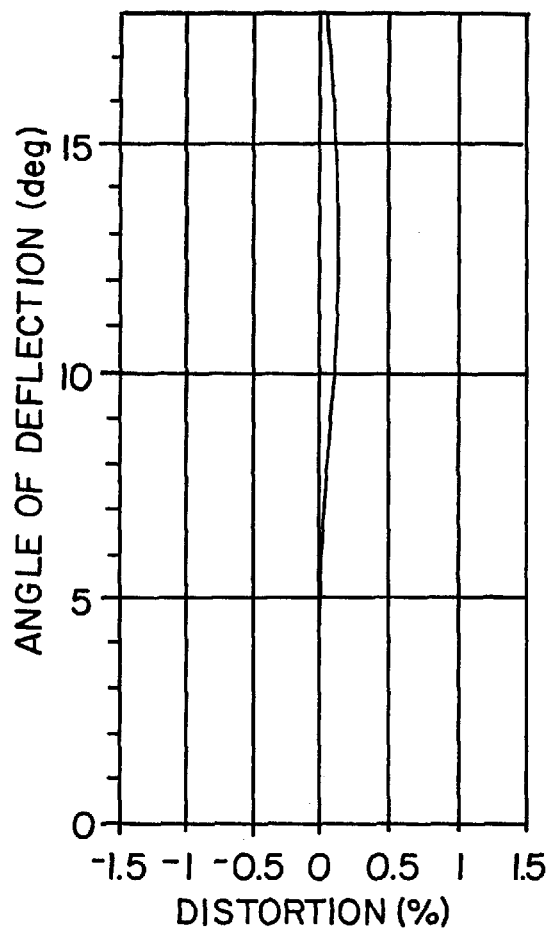
Figure 24:
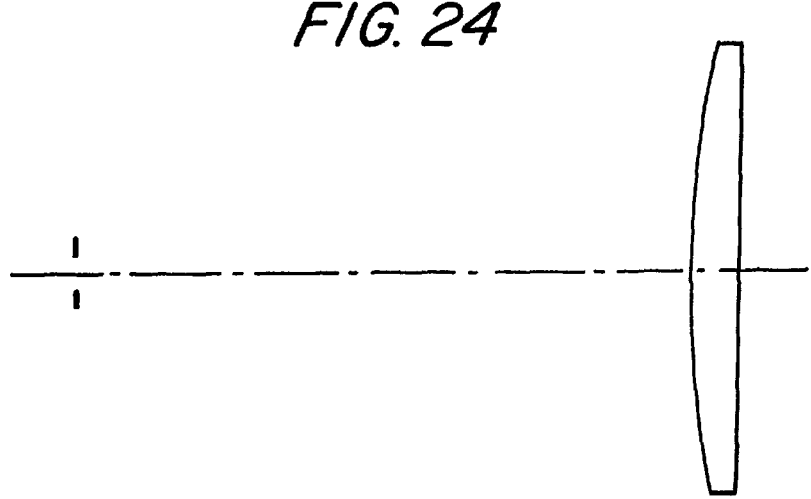
FIG. 24 shows the configuration of the scanning lens of the twelfth embodiment of the present invention.
Figure 25A:
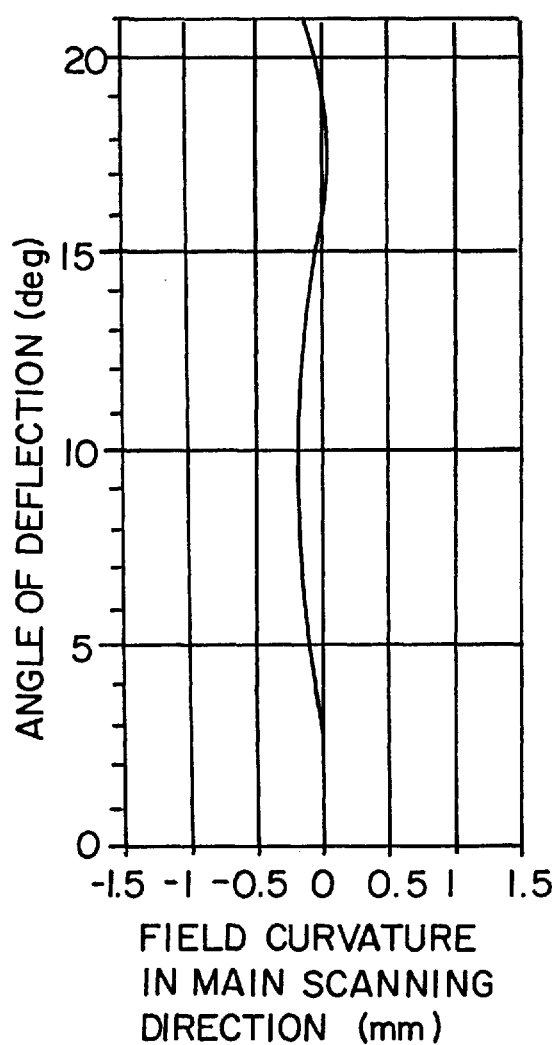
FIGS. 25A and 25B show aberration curves of the scanning lens of the thirteenth embodiment of the present invention.
Figure 25B:
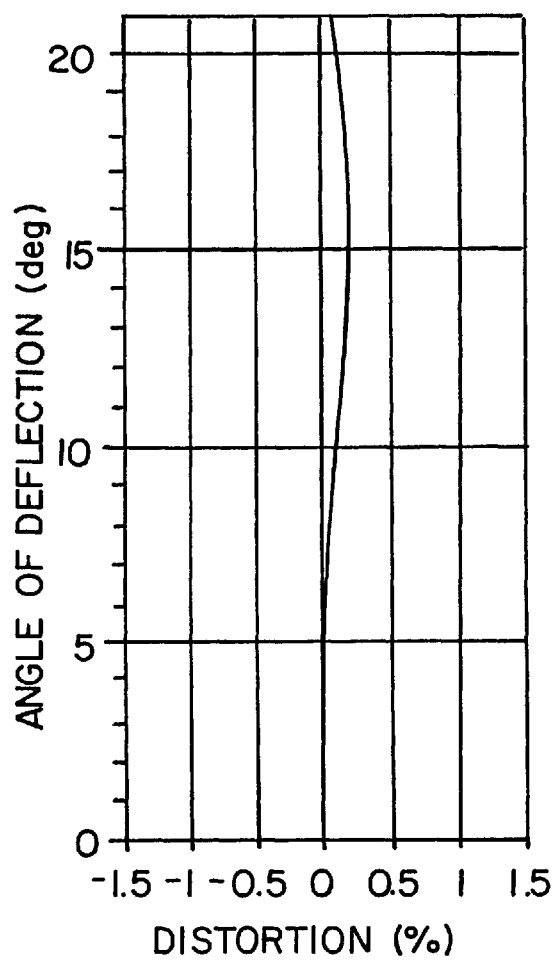
Figure 26:
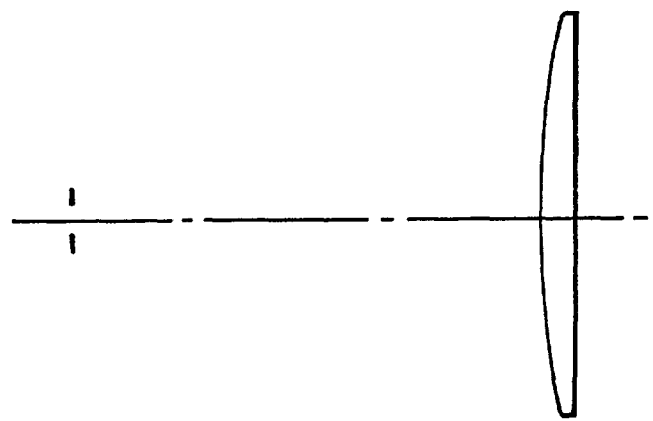
FIG. 26 show the configuration of the scanning lens of the thirteenth embodiment of the present invention.
Figure 27A:
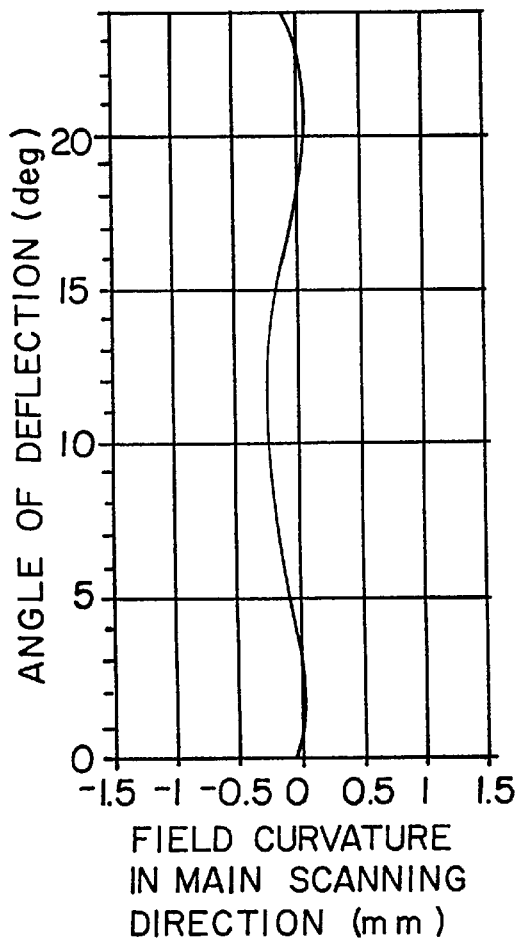
FIGS. 27A and 27B show aberration curves of the scanning lens of the fourteenth embodiment of the present invention.
Figure 27B:
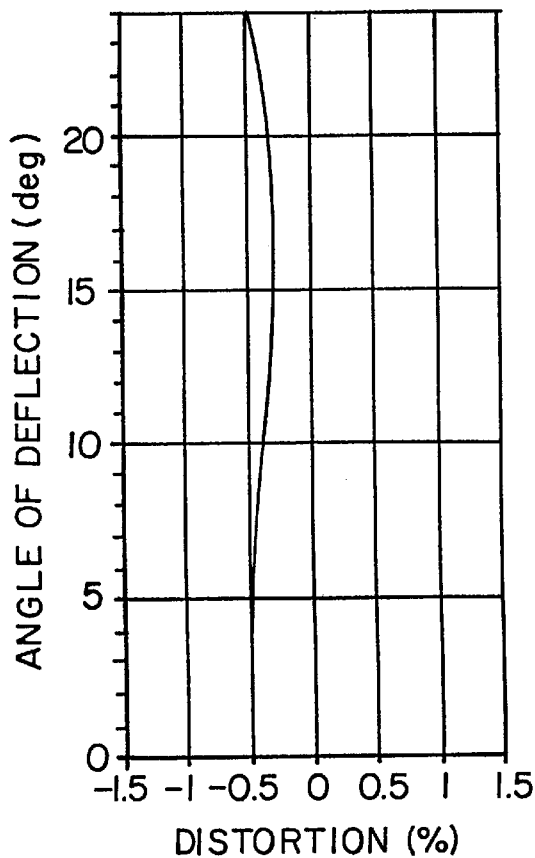
Figure 28:
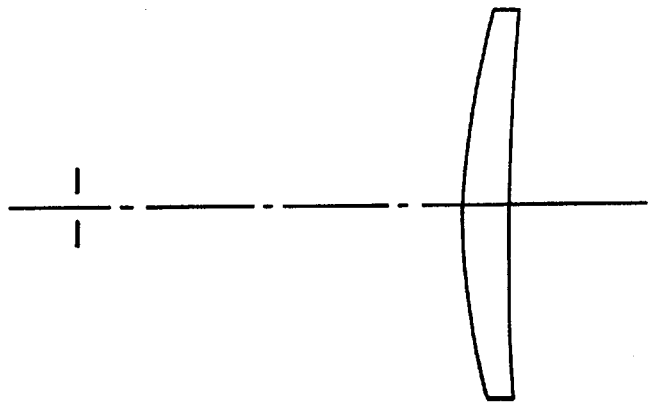
FIG. 28 show the configuration of the scanning lens of the fourteenth embodiment of the present invention.
Figure 29A:
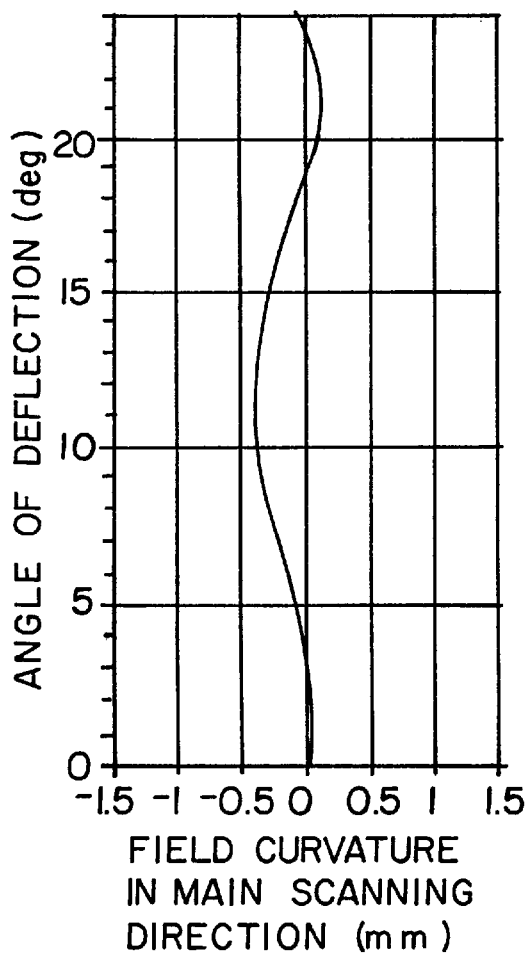
FIGS. 29A and 29B show aberration curves of the scanning lens of the fifteenth embodiment of the present invention.
Figure 29B:
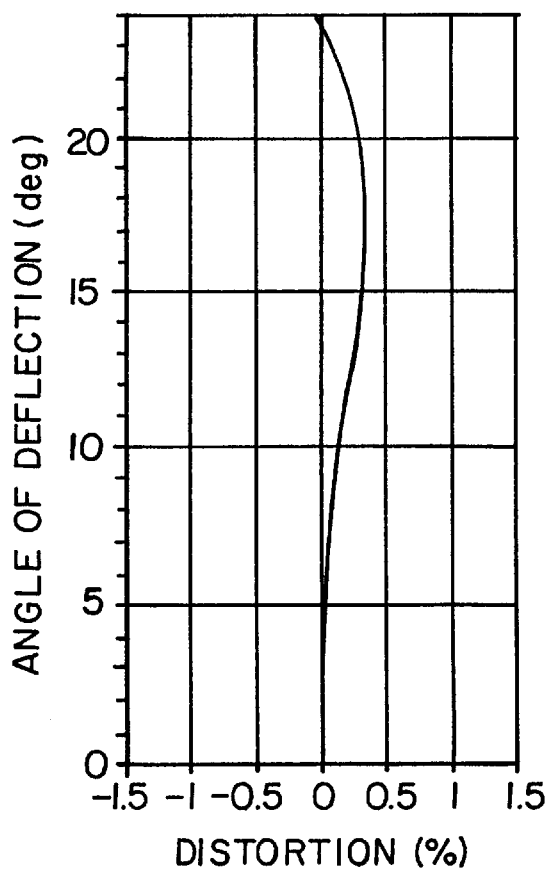
Figure 30:
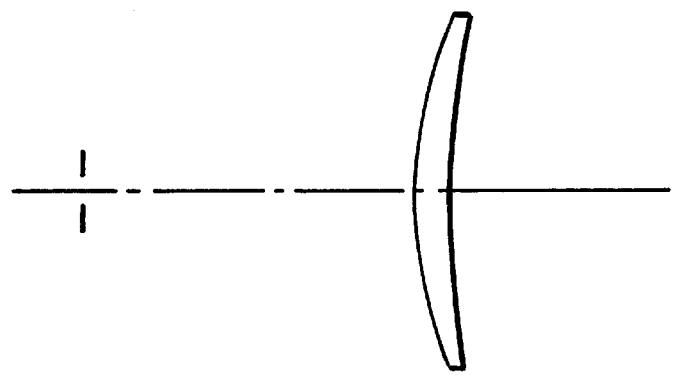
FIG. 30 shows the configuration of the scanning lens of the fifteenth embodiment of the present invention.
Figure 31A:
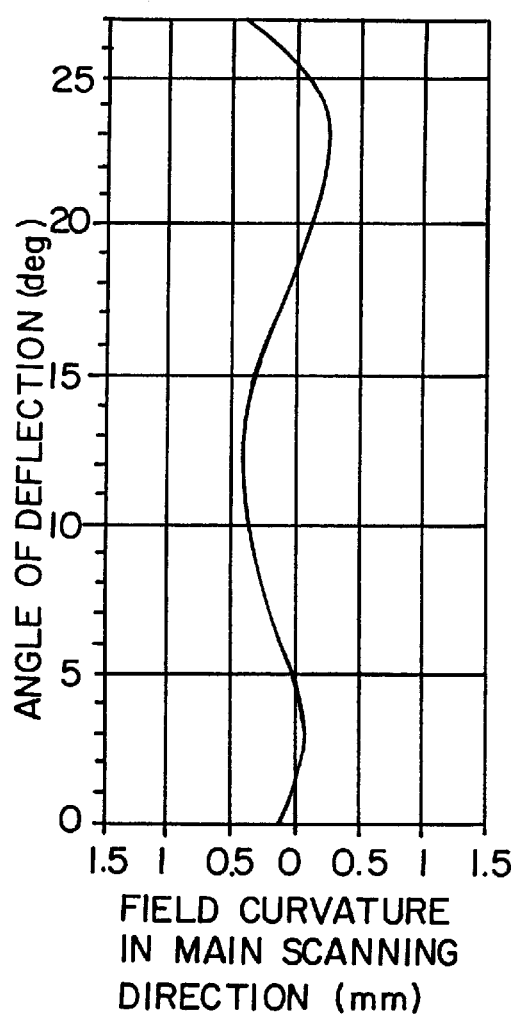
FIGS. 31A and 31B show aberration curves of the scanning lens of the sixteenth embodiment of the present invention.
Figure 31B:
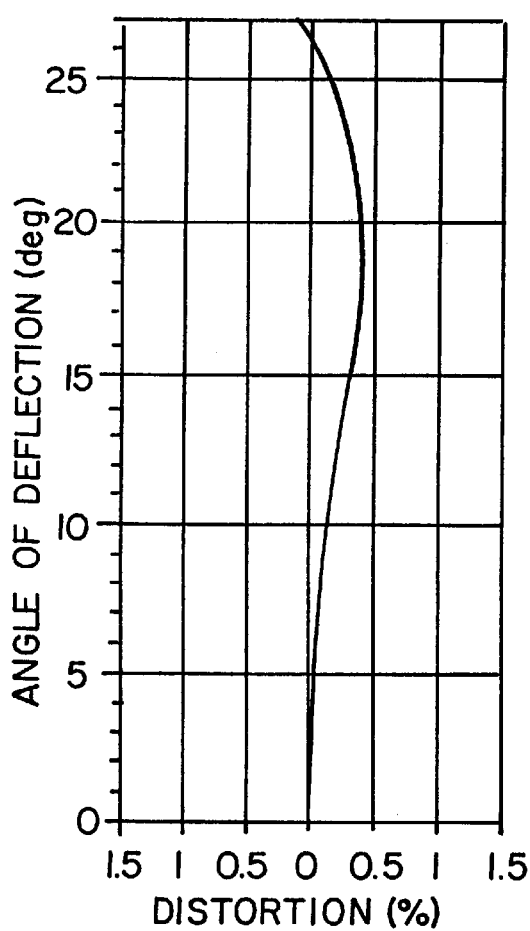
Figure 32:
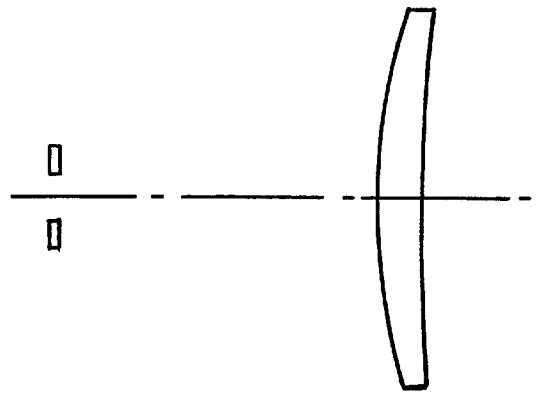
FIG. 32 shows the configuration of the scanning lens of the sixteenth embodiment of the present invention.

Subsequently, eleventh to sixteenth embodiments will be described. As shown in FIGS. 19 and 20, the scanning lens 15 of the eleventh to sixteenth embodiments is located between the polygonal mirror 14 and the scanned surface 16. The scanning lens 15 is a positive meniscus lens convex to the polygonal mirror 14 in the main scanning direction. The first surface $r_1$ facing to the polygonal mirror 14 is spherical, and the second surface $r_2$ facing to the scanned surface 16 is aspherical. Thus, the scanning lens 15 is of a simple configuration which is easy to process. Moreover, as indicated by the condition (15) and subsequently-described condition (18), the scanning lens 15 is arranged so that the axial distance $d_1$ between the deflecting surface of the polygonal mirror 14 and the first surface $r_1$ of the scanning lens 15 is shorter than the axial distance $d_3$ between the second surface $r_2$ of the scanning lens 15 and the in scanned surface 16. This arrangement reduces the size of the scanning optical system, which results in a reduction in size of the print head.

The scanning lens 15 of the eleventh to sixteenth embodiments is a single positive meniscus lens convex to the polygonal mirror 14 side, and is of a configuration such that the main curve of the first surface $r_1$ in the main scanning direction forms a circle. The main curve of the second surface $r_2$ in the main scanning direction forms a curve such that the radius of curvature in the main scanning direction decreases as the angle of view in the main scanning direction increases. By providing the scanning lens 15 with such a configuration, field of curvature in the main scanning direction and distortion are excellently corrected even when the distance between the scanning lens 15 and the polygonal mirror 14 is shorter than the distance between the scanning lens 15 and the scanned surface 16. The scanning lens 15 of these embodiments which is made of a resin having a refractive index of 1.6 or lower is inferior to a scanning lens made of glass in uniformity of the physical characteristics inside the lens and in accuracy of the lens surface. To solve this problem, in the scanning lens 15, the axial distance $d_2$ of the lens is 25 mm or shorter and the thickness $t_{min}$ of the lens in the vicinity of the maximum angle of deflection is 4 mm or greater to thereby decrease the thickness ratio of the scanning lens 15. The thickness ratio ($d_2/t_{min}$) is preferably 4 or lower.

Further, the eleventh to sixteenth embodiments fulfill the following conditions (16) to (20):

$$-7 < \frac{-nf}{c} + \frac{f}{s} < -3 \quad (16)$$

-continued $$-0.41 < \frac{-c}{f} < -0.13 \qquad (17)$$

$$\frac{d_1}{d_3} < 1 \qquad (18)$$

The variables are the same as those of the ninth and tenth embodiments.

When the upper and lower limits of the condition (16) are exceeded, field curvature cannot be corrected in the scanning lens 15 having a low refractive index and a low thickness ratio. When the upper and lower limits of the condition (17) are exceeded, it is difficult to correct distortion.

Specific data of the above-described first to eighth embodiments are shown in Tables 17 to 24.

In the tables, $d_1$ is the axial distance between the deflecting surface of the polygonal mirror 14 and the first surface $r_1$ of the scanning lens 15, $d_2$ is the axial distance between the first and second surfaces $r_1$ and $r_2$ of the scanning lens 15, $d_3$ is the axial distance between the second surface $r_2$ of the scanning lens 15 and the scanned surface 16, $r_1$ is an axial radius of curvature of the first surface $r_1$ of the scanning lens 15 in the main scanning direction, $r_2$ is an axial radius of curvature of the second surface $r_2$ of the scanning lens 15 in the main scanning direction, n is the refractive index of the scanning lens 15, f is the focal length of the scanning lens 15 in the main scanning direction, c is the distance from the deflecting surface of the polygonal mirror 14 to the front principal point H of the scanning lens 15, s is the distance from the front principal point H of the scanning lens 15 to the point of natural convergence of the convergent luminous flux, $s_1$ is a distance from the deflecting surface of the polygonal mirror 14 to the point of natural convergence of the convergent luminous flux, L is a distance from the deflecting surface of the polygonal mirror 14 to the scanned surface 16, Y is a scanning width, and Φ is an angle of view of the scanning lens 15.

When a surface of the scanning lens 15 is aspherical, the configuration of the aspherical surface is defined by the following equation:

$$x = \frac{Co\Phi 2}{1 + (1 - \varepsilon Co2\Phi 2)^{\frac{1}{2}}} + \sum Ai\Phi i$$

where x is a coordinate along the optical axis from the vertex, Co is a paraxial radius of curvature of the aspherical surface, Φ is a distance from the optical axis, Ai (i=2 to 10) is a higher-order parameter, and e is a conic constant.

While the lens surface configuration in the sub scanning direction is not defined in the tables, the scanning lens 15 may be of a configuration such that its first surface $r_1$ is a spherical surface having a radius of curvature in the main scanning direction and its second surface $r_2$ is an aspherical surface such that the radius of curvature in the sub scanning direction which varies as the angle of view in the main scanning direction increases. This configuration enables the correction of distortion in the sub scanning direction varying with the angle of view in the main scanning direction.

The values of $-nf/c$, $f/s$, $-nf/c$, $+f/s$ and $-c/f$ of the conditions (13), (14), (16) and (17) for each embodiment are shown in Table 25. The values of $d_2/t_{min}$ are also shown in Table 25 for reference.

As is clear from the above description, according to the ninth to sixteenth embodiments, field curvature in the main scanning direction and distortion are excellently corrected even in a single scanning lens made of a resin of a low refractive index and having a configuration that is easy to mold and has a low thickness deviation ratio. Further, since the axial distance $d_1$ between the deflecting surface and the first surface of the scanning lens is shorter than the axial distance $d_3$ between the second surface of the scanning lens and the scanned surface, the size of the scanning optical system is reduced.

Hereinafter, the seventeenth to nineteenth embodiments will be described. A scanning lens of these embodiments includes one fθ lens for imaging on a scanned surface a convergent luminous flux from the point of deflection. Both the first and second surfaces thereof are aspherical, and the following conditions (21) to (27) are fulfilled. The scanning lens is preferably made of resin which is advantageous in cost and mass production.

$$r_1 < 0 \qquad (21)$$

$$\frac{r_1}{r_2} > 0 \qquad (22)$$

$$a_{ymax} < a' \qquad (23)$$

$$0 < \frac{a}{G} < 0.15 \qquad (24)$$

$$0 < \frac{t}{G} < 0.25 \qquad (25)$$

$$1.1 < \frac{L}{G} < 1.5 \qquad (26)$$

$$\frac{|f|}{G} < 1.5 \qquad (27)$$

where $r_1$ is a paraxial radius of curvature of the first surface, $r_2$ is a paraxial radius of curvature of the second surface, $a_{ymax}$ is a distance from the position of the point of deflection to the position at which a luminous flux passing the upper limit of the effective height of the lens passes through the first surface which distance is measured parallel to the optical axis, a' is a distance from the position of the point of deflection to the position at which a luminous flux passing the upper limit of the effective height of the lens passes through a spherical surface extending from the position of the optical axis on the first surface with a paraxial radius of curvature $r_1$, G is a distance from the point of deflection to the image surface, a is a distance from the point of deflection to the first surface, t is a thickness of the center of the lens, L is a width of scanning (width of the image surface), and f is a focal length.

Figure 33:
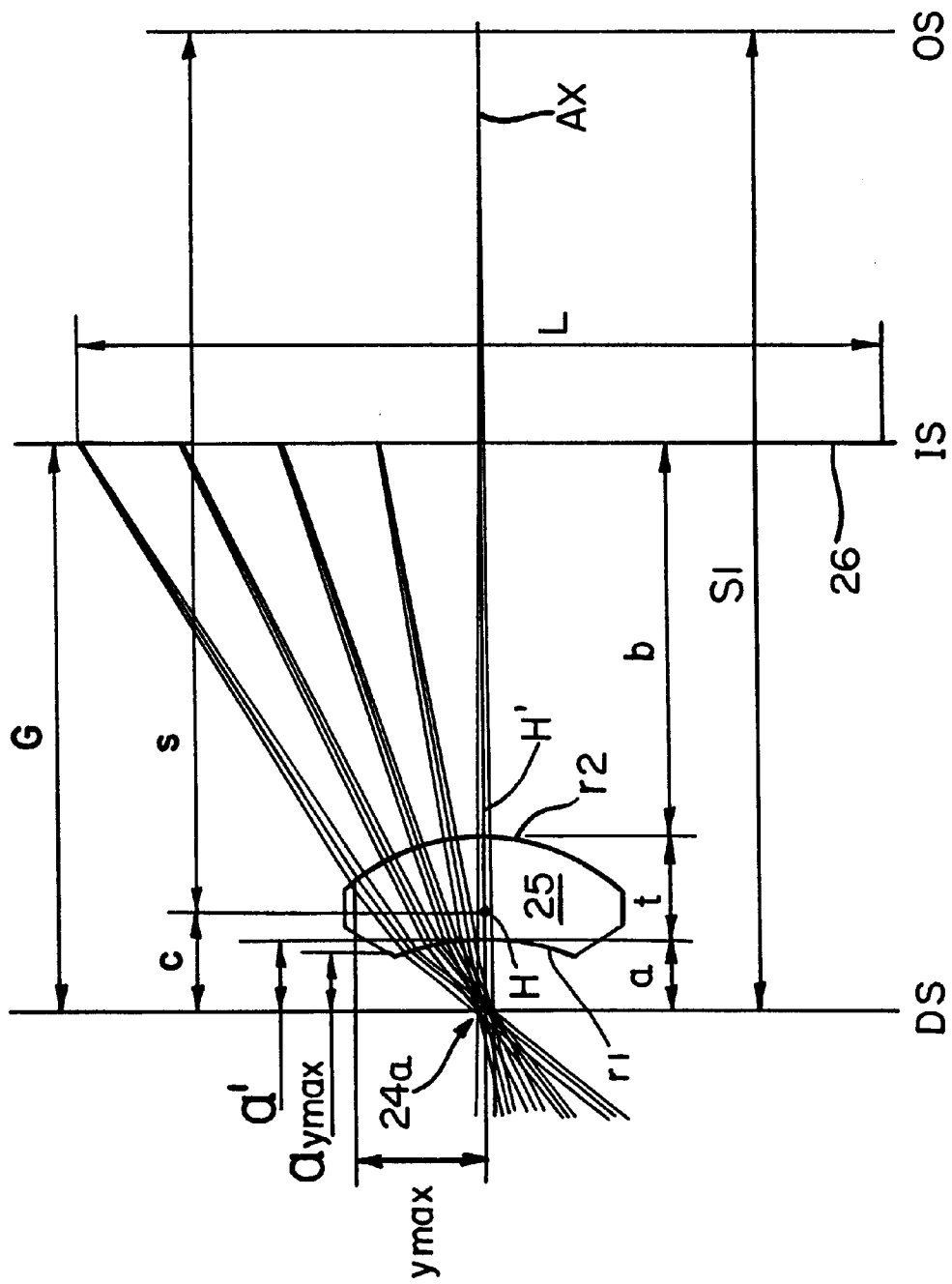
FIG. 33 is a view of assistance in explaining the optical path and performance of a scanning lens of the present invention.
Figure 34:
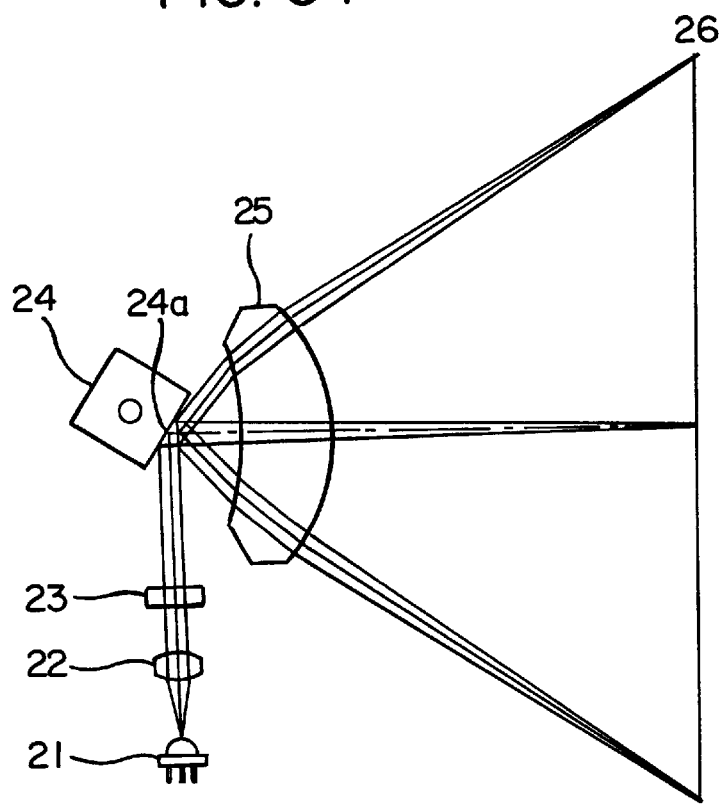
FIG. 34 shows the schematic arrangement and optical paths of a scanning optical system using the scanning lens of the seventeenth to nineteenth embodiments of the present invention.

FIG. 33 shows the positions and distances of the variables in the above-mentioned conditions. FIG. 34 shows the arrangement of the whole scanning optical system using the scanning lens of the present invention. The reference designations in FIG. 33 are defined as follows: H is a front principal point of the scanning lens; H' is a rear principal point of the scanning lens; OS is a point of natural convergence of a luminous flux incident on the scanning lens (i.e. the axial point of convergence of the luminous flux when no scanning lens is provided); DS is a point of deflection; IS is the position of the image surface (scanned surface); b is a distance from the second surface of the scanning lens to the image surface position IS; c is a distance from the point of deflection DS to the front principal point H; S is a distance from the front principal point H to the point of natural convergence OS; $S_1$ is a distance from the deflection position DS to the point of natural convergence OS; and $Y_{max}$ is an effective height of the lens.

As shown in FIG. 34, a luminous flux emitted from a light source 21 (e.g. laser diode (LD), light emitting diode (LED)) is regulated by a condenser lens 22 so as to be converged at the point of natural convergence OS (FIG. 33). After passing through a cylindrical lens 23, the converged luminous flux is reflected by a deflector 24 (24a is the point of deflection) and incident on a scanning lens 25. The cylindrical lens 23 has a refractive power only in the sub scanning direction in order to compensate the inclination of the deflector 24.

At the position IS of the scanned surface (FIG. 33), a beam spot having excellent image surface performance and linearity and having coma excellently corrected is formed by the scanning lens 25. Although the point of deflection 24a is slightly shifted within the main scanning plane by the working of the deflector 24, scanning is performed on the image surface (scanned surface) 26 so as to form an arc having a radius $S_1$ (FIG. 33) with the point of deflection 24a substantially as the center.

The beam incident on the deflector 24 is a convergent luminous flux in the main scanning direction. When a convergent luminous flux is incident, the amount of aberrations at the image surface 26 when an angle of deflection (angle of view between a deflected luminous flux and an optical axis AX) θ formed by the deflector 24 is large is more excellent than when a parallel luminous flux is incident. For this reason, a large angle of deflection θ is obtained, whereby the size of the whole apparatus can be reduced. In the prior art arrangements of Japanese Laid-open Patent Applications Nos. S62-139520 and S63-157122, since the beam incident on the deflector is a parallel luminous flux, no such an advantage is obtained.

The optical performance required for the single scanning lens 25 arranged between the point of deflection 24a and the image surface 26 is linearity and image surface performance within the main scanning plane. Linearity is a performance to make a luminous flux deflected by the deflector 24 at a uniform angular velocity scan the scanned surface 26 at a uniform velocity. To obtain an excellent linearity, with respect to an image height y and the angle of deflection θ, the values defined by the following expression should be small. Image surface performance is a performance to condense the deflected luminous flux within its effective angle of deflection on the image surface 26. To obtain excellent optical performance, it is necessary that coma as well as the paraxial performance of the luminous flux is restrained.

$$\frac{\left(\frac{dy}{d\theta}\right)_\theta - \left(\frac{dy}{d\theta}\right)_{\theta=0}}{\left(\frac{dy}{d\theta}\right)_{\theta=0}}$$

Even if a convergent luminous flux is incident to obtain excellent linearity and image surface performance, since the degree of freedom of design is small, it is difficult to reduce the distance G unless the first surface or both of the surfaces of the scanning lens 25 are aspherical. Further, to increase the angle of deflection θ in order to reduce the distance G, it is indispensable that both of the surfaces of the scanning lens 25 are aspherical like in the present embodiments.

The conditions (21) and (22) show that the scanning lens 25 is a meniscus lens whose first and second surfaces are both concave to the point of deflection 24a in the vicinity of the optical axis. The condition (23) relates to the position at which a luminous flux passing the upper limit of the effective height $Y_{max}$ of the lens passes through the first surface and the position at which the luminous flux passing the upper limit of the effective height $Y_{max}$ of the lens passes through a spherical surface extending from the position of the optical axis on the first surface with the paraxial radius of curvature $r_1$, and shows that the distance between the former position and the point of deflection 24a is shorter than the distance between the latter position and the point of deflection 24a.

By fulfilling the conditions (21) to (23), the aspherical first and second surfaces (having the paraxial radii of curvature $r_1$ and $r_2$, respectively) are provided with a configuration such that the curvature increases from the center to the edge along the height. Since the distance between the first surface and the deflector 24 is shorter when the angle of deflection θ is large than in the vicinity of the optical axis, the size of the scanning lens 25 does not increase even if the angle of deflection θ increases. When a meniscus lens is used as the scanning lens, since the thickness difference is small, molding of the lens is easy.

When the limits of the conditions (21) to (23) are exceeded, the reduction in distance between the scanning lens 25 and the point of deflection 24a makes no contribution to the reduction in length of the lens in the main scanning direction. When the surfaces are not aspherical, since the thickness difference increases, molding of the lens is not very easy. To improve the image surface performance and linearity, it is preferable that the first and second surfaces fulfill the conditions (21) to (23) and have a similar configuration. In that case, as a natural consequence, the scanning lens 25 has a configuration such that the thickness difference is smaller.

The condition (24) shows a relationship between the distance a from the point of deflection 24a to the first surface and the distance G. Since the size of the scanning lens 25 is reduced in the main scanning direction by reducing the distance a, it is unnecessary to increase the size of the scanning lens 25 even if the range of the angle of deflection is widened. When the limits of the condition (24) are exceeded, the distance between the scanning lens 25 and the image surface 26 decreases. As a result, the size of the scanning lens 25 is increased in the main scanning direction.

The condition (25) shows a relationship between the thickness t of the center of the scanning lens 25 and the distance G. When the limits of the condition (25) are exceeded, the thickness t is abnormally large. The increase in thickness t makes the molding of the lens less easy and increases the size of the whole apparatus.

The condition (26) shows a relationship between the scanning width L and the distance G. When the lower limit of the condition (26) is exceeded, the size of the apparatus increases. When the upper limit thereof is exceeded, satisfactory performance (linearity and image surface performance) cannot be obtained in the lens of this configuration.

The condition (27) shows a relationship between the focal length f and the distance G. Preferably, the scanning lens fulfilling the condition (27) further fulfills the following condition (28):

$$1.2 < \frac{|f|}{G} < 1.5 \quad (28)$$

When the upper limit of the condition (28) is exceeded (i.e. when the condition (27) is not fulfilled), the linearity increases toward the minus side at the center of the angle of view and toward the plus side at the ends of the angle of view, so that the performance as an fθ lens is not obtained. When the lower limit of the condition (28) is exceeded, although the linearity and image surface performance are excellent, the distance G from the point of deflection 24a to the image surface 26 increases, so that the size of the apparatus increases. In addition, since the distance a from the point of deflection 24a to the first surface of the scanning lens 25 decreases, a deflector such as a polygonal mirror cannot be used in which the center of rotation and the deflecting surface are apart from each other. Moreover, although coma increases, this is not a problem when the f-number is approximately 70. Subsequently-shown seventeenth and eighteenth embodiments are examples fulfilling the condition (28). A nineteenth embodiment is an example where $|f|/G=0.87$ on the assumption that a galvanomirror is used.

By fulfilling the conditions (24) to (27) as described above, the image surface performance and linearity are excellently corrected by using only a single lens while enabling a large reduction in distance a, reduction in distance G and reduction in size of the scanning lens 25 in the main scanning direction. Moreover, by reducing the distance G, the size of the whole apparatus using the scanning lens 25 is reduced.

In the present invention, it is preferable to further fulfill the following condition (29):

$$0 < \frac{2 \cdot y_{max}}{L} < 0.4 \qquad (29)$$

The condition (29) shows a relationship between the length ($2 \cdot Y_{max}$) of the scanning lens 25 in the main scanning direction and the scanning width L. When the upper limit of the condition (29) is exceeded, the size of the scanning lens 25 increases.

Figure 35:
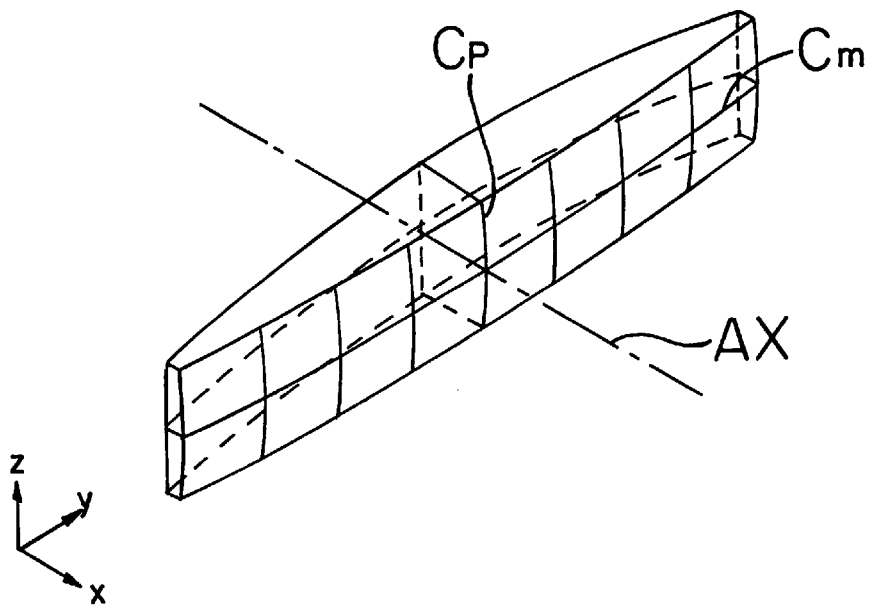
FIG. 35 is a view of assistance in explaining a deformed toric surface used for the scanning lens of the seventeenth to nineteenth embodiments.

With respect to the sub scanning direction, the luminous flux can be condensed by continuously varying in the direction of y the curvature of one or both of the first and second surfaces in the sub scanning direction. The first and second surfaces are preferably surfaces as shown in FIG. 35 such that the curvature in the main scanning direction is aspherical and that the curvature in the sub scanning direction continuously varies relative to the displacement in the direction of y (this surface is referred to as a deformed toric surface herein). The deformed toric surface is defined by the following condition:

$$x = \frac{vy^2}{1+(1-\mu v^2 y^2)^{\frac{1}{2}}} + \rho + A$$

where $v = V/(1-Vp)$;
$\rho = Cz^2 / \{1+(1-C^2z^2)^{1/2}\}$;
$A = a_{22}y^2z^2 + a_{42}y^2z^2 + a_{62}y^2z^2 + a_{82}y^2z^2 + \ldots + a_{04}y^2 + a_{06}y^2 + a_{08}y^2 + '\ldots$;

x is a direction along the optical axis;
y is the main scanning direction;
z is the sub scanning direction;
1/C is a radius of curvature of a profile curve $C_p$ (radius of curvature in the sub scanning direction at the vertex of a main curve $c_m$);
1/V is a radius of curvature of the main curve $C_m$ at the vertex;
$a_{j2}$ is a coefficient representative of a variation in radius of curvature in the direction of y (angle of view) in the sub scanning direction;

$a_{oj}$ is a coefficient representative of a variation in radius of curvature of the main curve in the direction of y (angle of view); and $\mu$ is a conic constant in the direction of the main curve.

Data of seventeenth to nineteenth embodiments of the present invention are shown in Tables 26 to 28. In the tables, n is a refractive index of the scanning lens to a light having a wavelength of 780 nm, and $2\omega$ is a maximum angle of view with respect to the scanning lens (i.e. (the maximum angle of deflection)×2).

Figure 36:
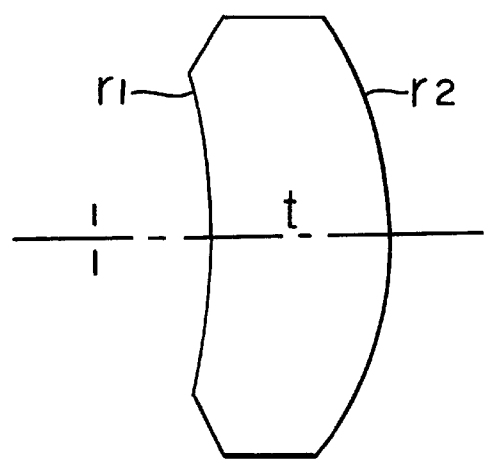
FIG. 36 is a cross-sectional view of a seventeenth embodiment of the present invention.
Figure 40:
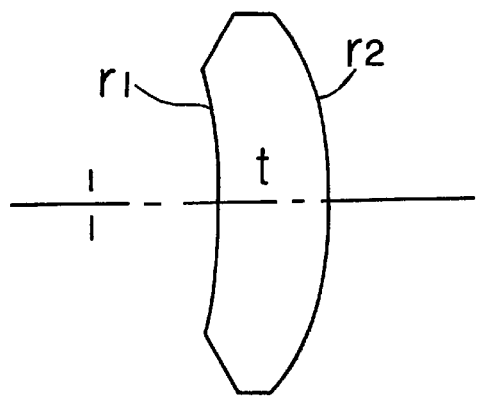
FIG. 40 is a cross-sectional view of an eighteenth embodiment of the present invention.
Figure 44:
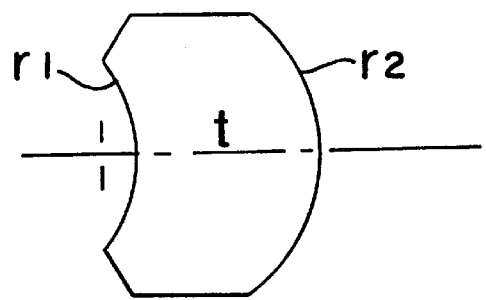
FIG. 44 is a cross-sectional view of a nineteenth embodiment of the present invention.

FIGS. 36, 40 and 44 cross-sectionally show the seventeenth to nineteenth embodiments with respect to the main scanning direction. Since these embodiments are made of resin, they are inexpensive and can be mass-produced. Moveover, since there is one point of inflection, they are easier to mold than the conventional lens of Japanese Laid-open Patent Application No. H4-50908.

Figure 37:
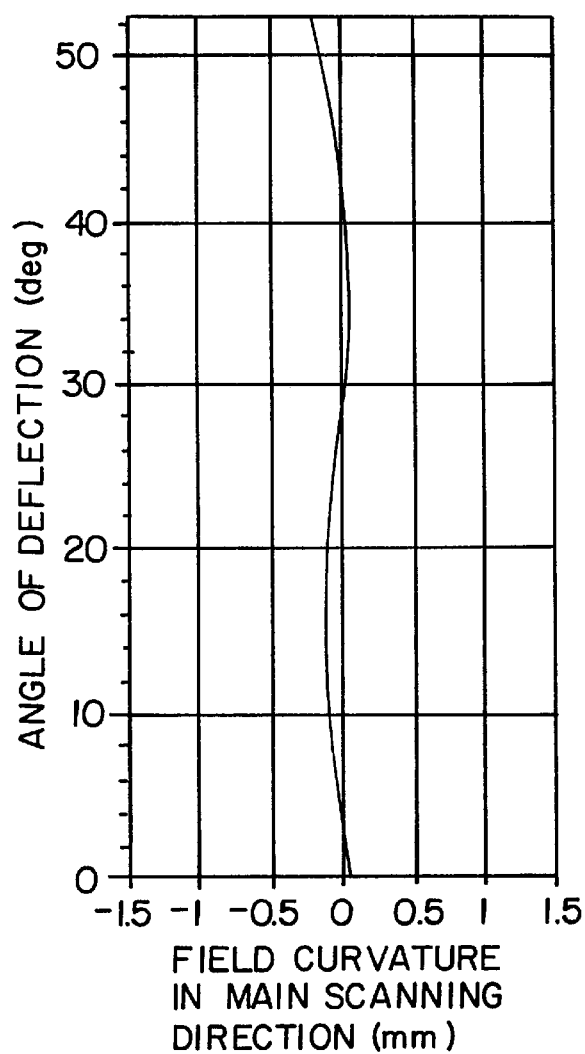
FIG. 37 shows field curvature of the seventeenth embodiment of the present invention in the main scanning direction.
Figure 38:
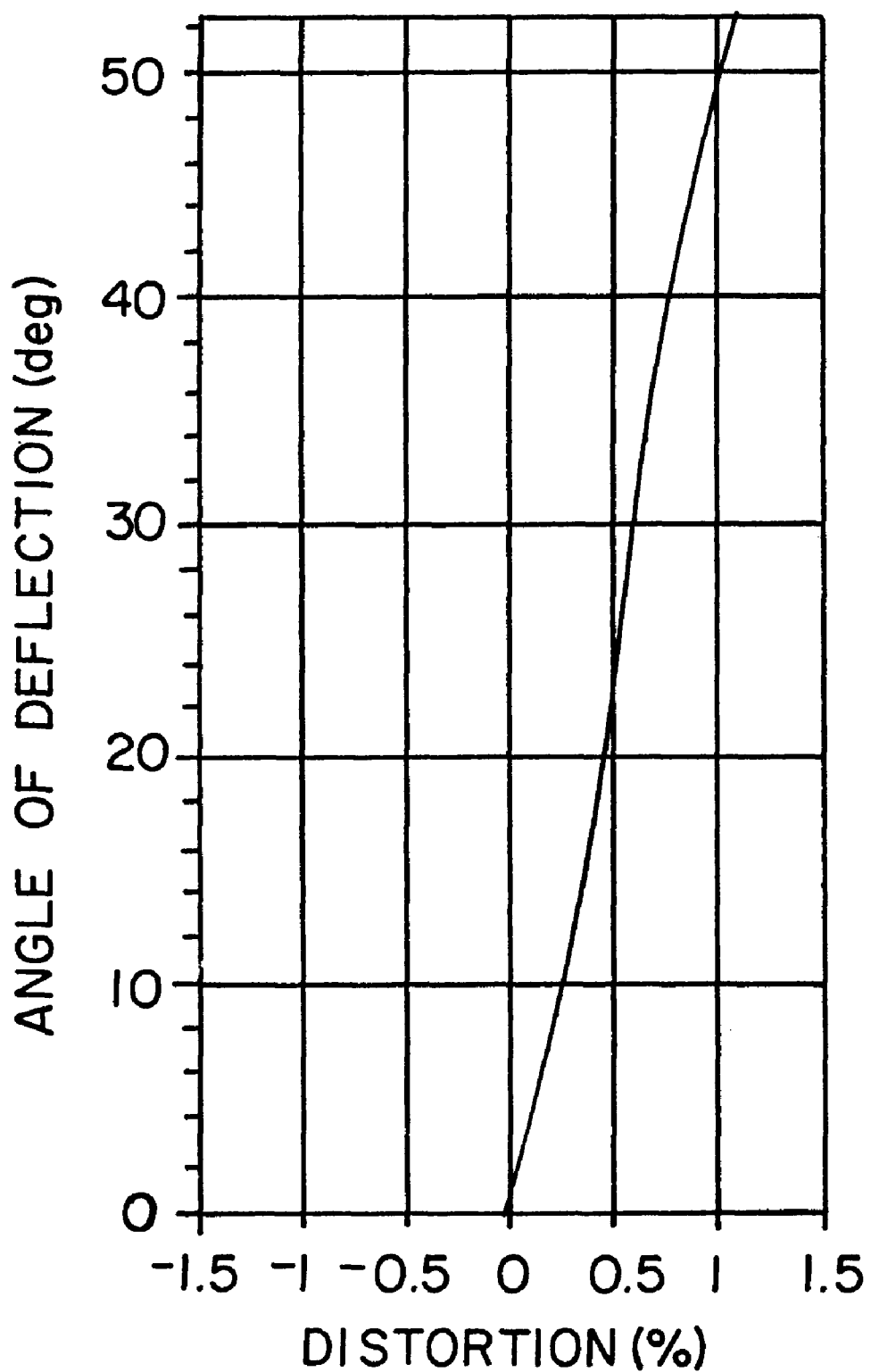
FIG. 38 shows distortion of the seventeenth embodiment of the present invention.
Figure 39:
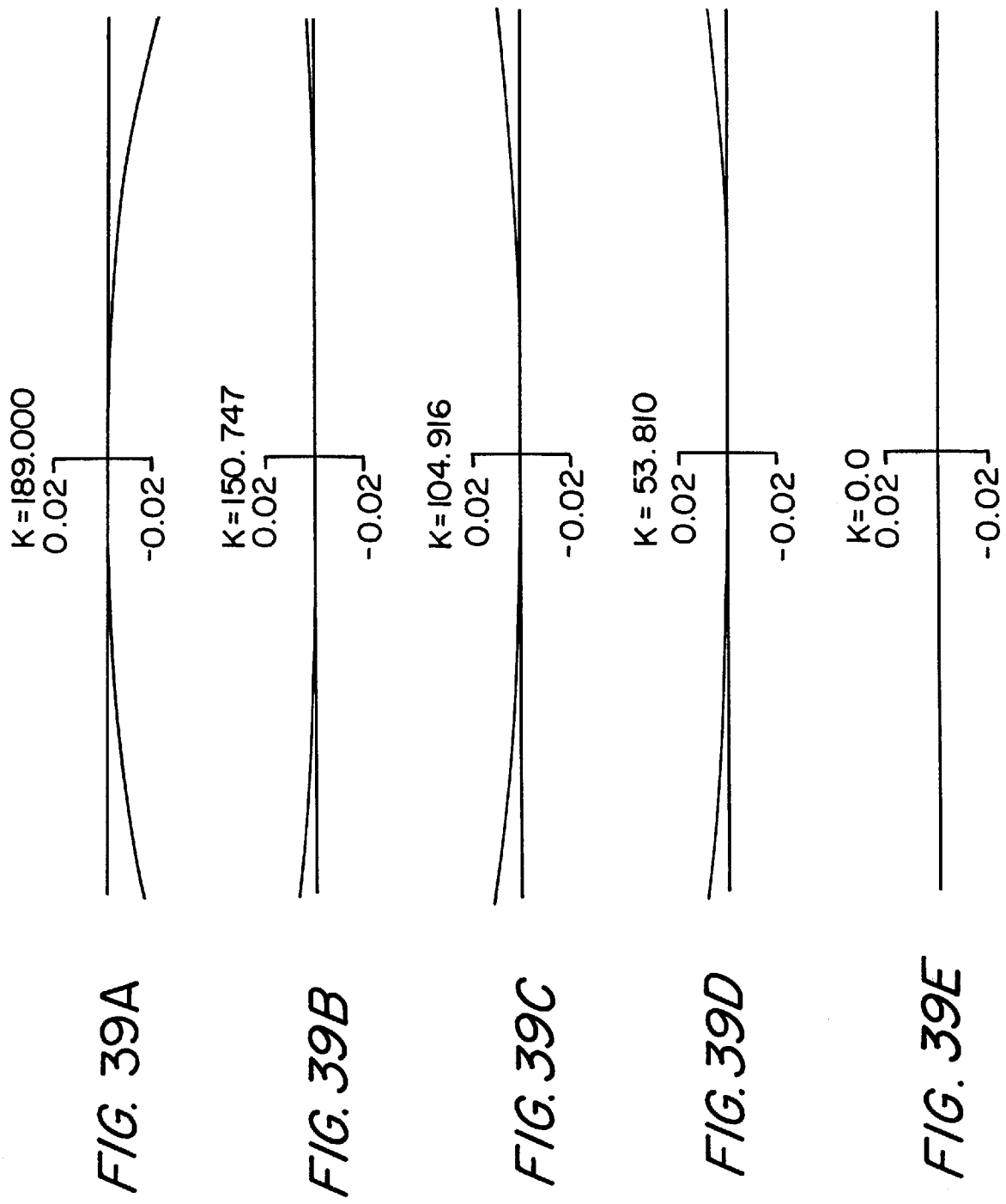
FIGS. 39A to 39E show lateral aberrations of the seventeenth embodiment of the present invention.
Figure 41:
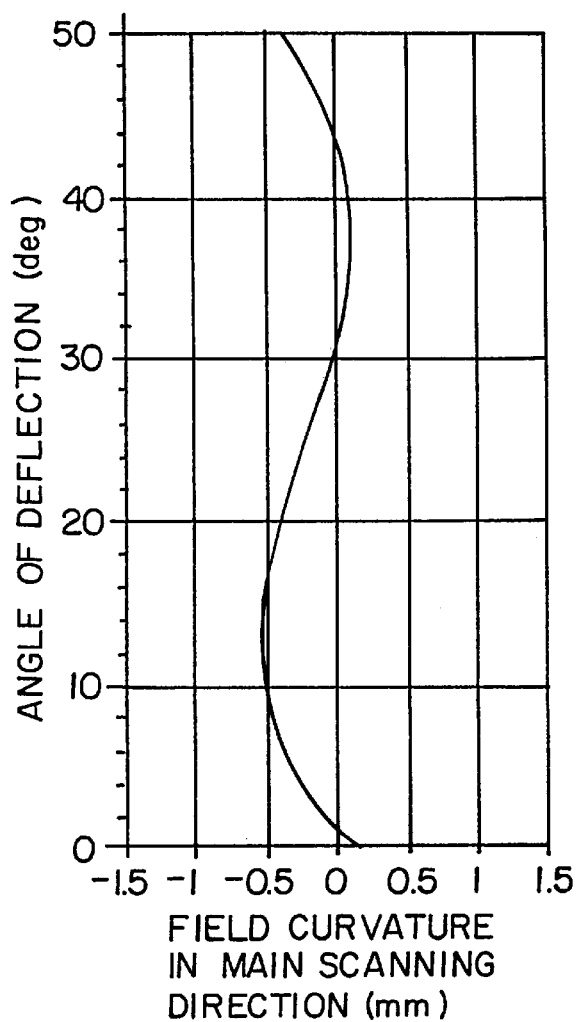
FIG. 41 shows field curvature of the eighteenth embodiment of the present invention in the main scanning direction.
Figure 42:
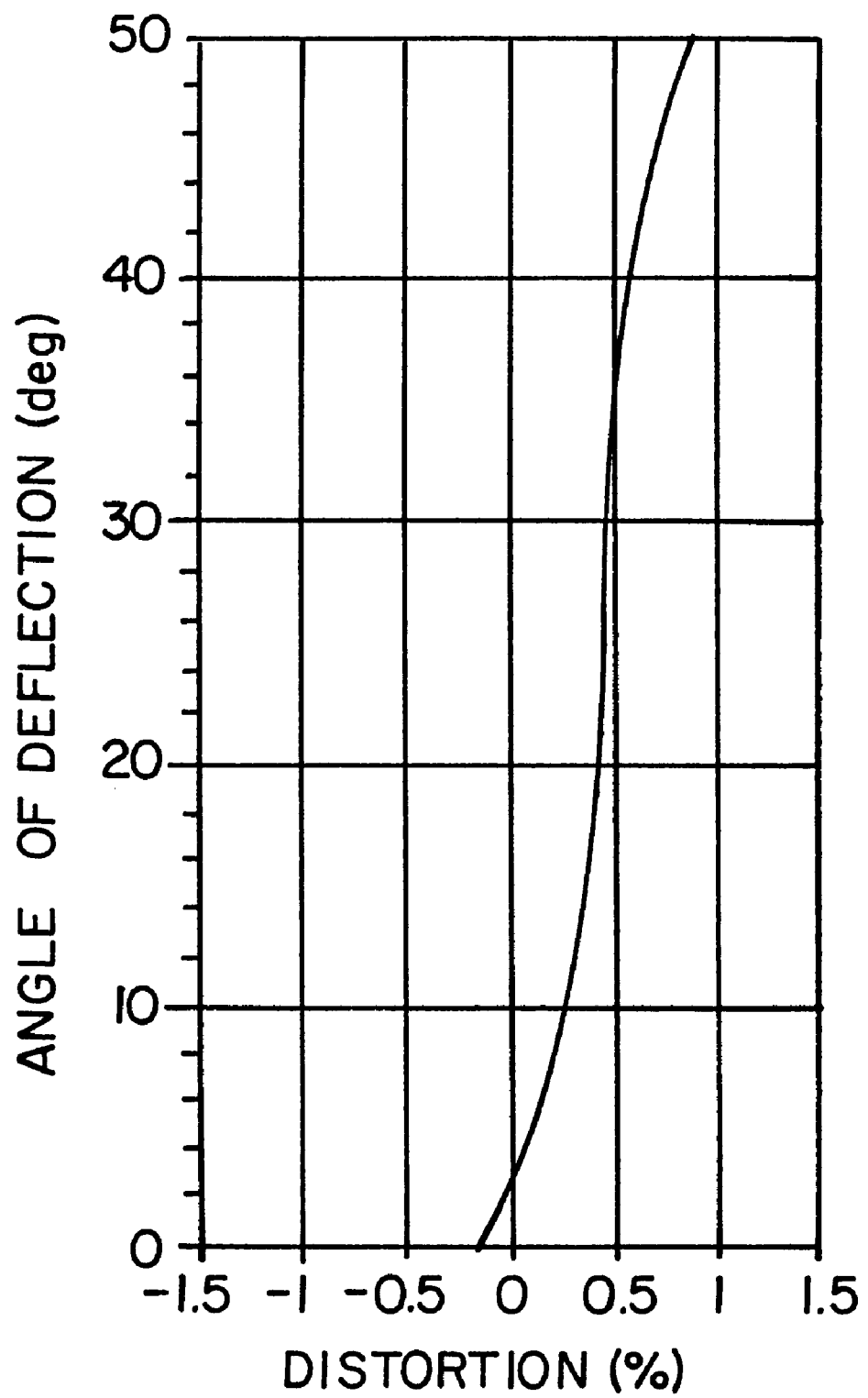
FIG. 42 shows distortion of the eighteenth embodiment of the present invention.
Figure 43:
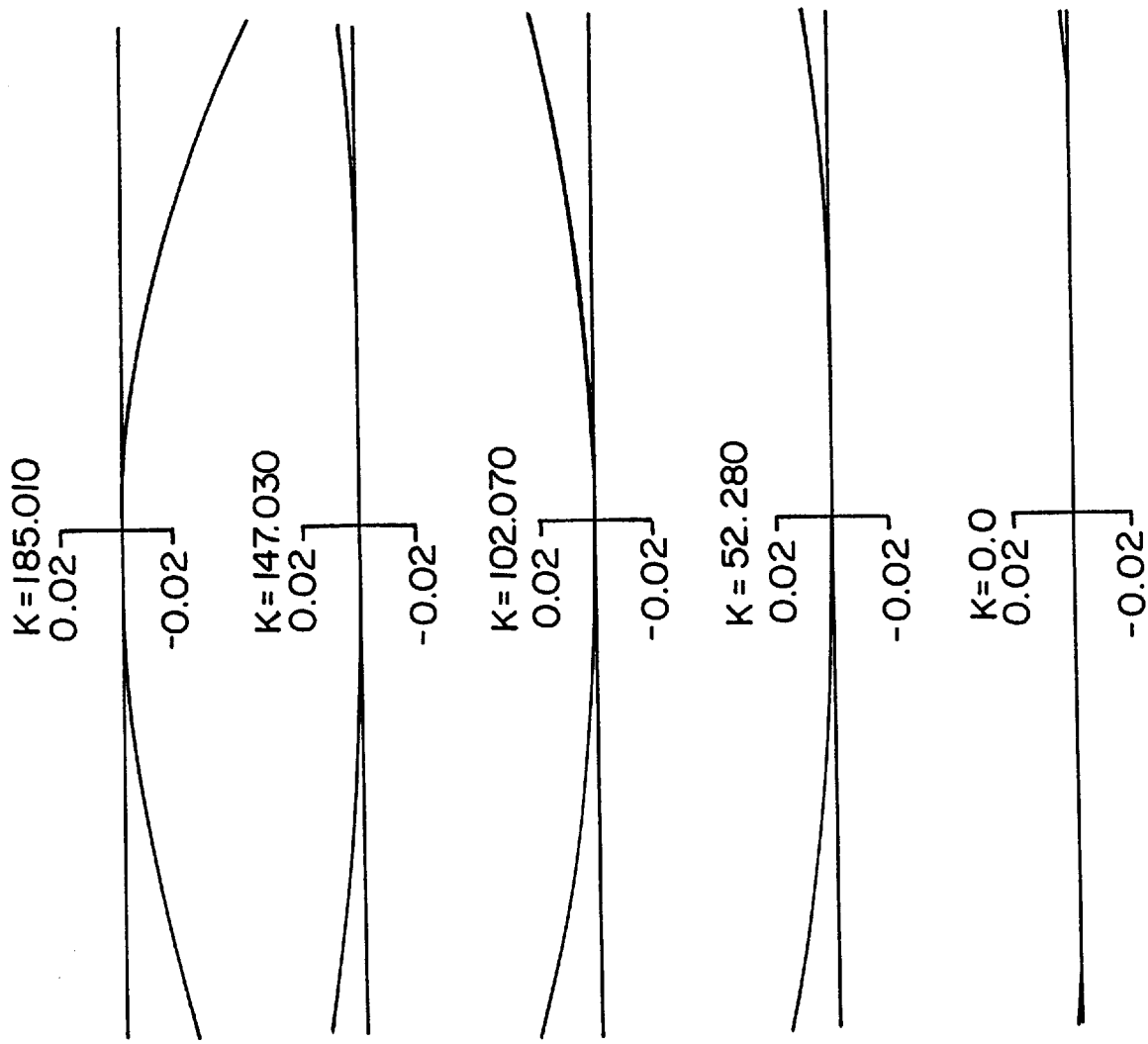
FIGS. 43A to 43E show lateral aberrations of the eighteenth embodiment of the present invention.
Figure 45:
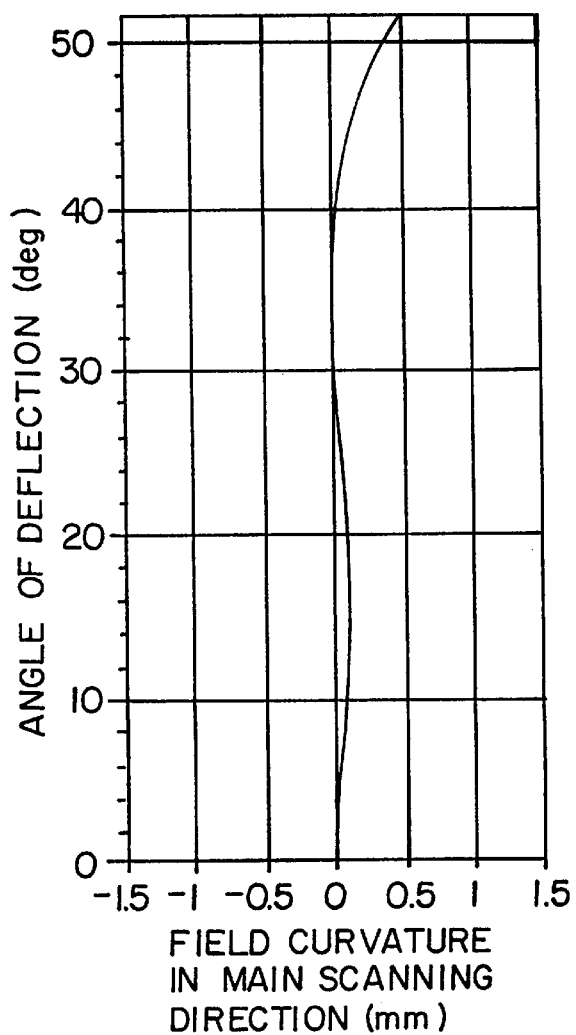
FIG. 45 shows field curvature of the nineteenth embodiment of the present invention in the main scanning direction.
Figure 46:
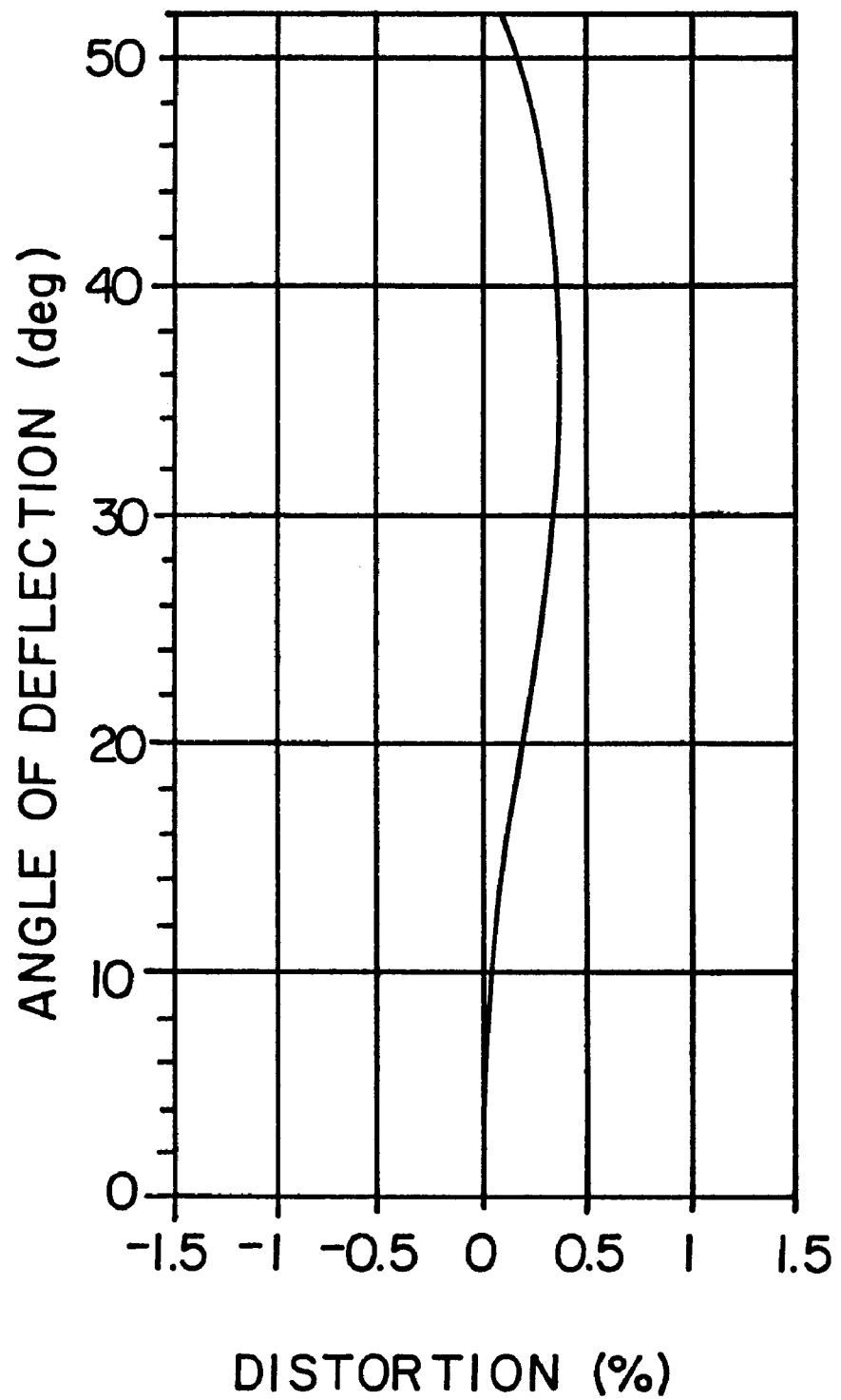
FIG. 46 shows distortion of the nineteenth embodiment of the present invention.

FIGS. 37, 38, 39A to 39E, 41, 42, 43A to 43E, 44, 46 and 47A to 47E show aberration curves of the seventeenth to nineteenth embodiments. FIGS. 37, 41 and 45 show main scanning field curvature of the seventeenth to nineteenth embodiments. FIGS. 38, 42 and 46 show distortion of the seventeenth to nineteenth embodiments. FIGS. 39A to 39E, 43A to 43E and 47A to 47E show lateral aberrations (lateral aberrations on the Gaussian surface of a meridional light beam of the seventeenth to nineteenth embodiments. K is the amount of aberrations on the image surface of a luminous flux at an angle of deflection $\theta$ defined by $K = S_1 \times \sin\theta$.

As described above, according to the seventeenth to nineteenth embodiments, in a scanning lens including one fθ lens for imaging on a scanned surface a convergent luminous flux from the point of deflection, the first and second surfaces are both aspherical and the above-described conditions (21) to (27) are fulfilled. As a result, the reduction in distance from the point of deflection to the image surface and in length of the lens in the main scanning direction, and the widening of the range of the angle of deflection are achieved while maintaining desired optical performance.

Obviously, many modifications and variations of the present invention are possible in light of the above teachings. It is therefore to be understood that within the scope of the appended claims, the invention may be practiced other than as specifically described.

TABLE 1

1st Embodiment

| | | |
|---|---|---|
| $d_1 = 165$ | $d_2 = 15$ | $d_3 = 165$ |
| $R_{1H} = 420$ | $R_{2H} = -510$ | |
| $R_{1G} = 420$ | $R_{2G} = -54.5$ | |
| $a_{22} = 1.5 \times 10^{-7}$ | $a_{04} = 0$ | $a_{24} = 0$ |
| $n = 1.5722$ | $f_H = 405$ | |
| $t = -169.3$ | $s = 299$ | $s_1 = 468.3$ |

$$\frac{d_1}{d_3} = 1$$

$$\frac{|R_{1H}|}{|R_{2H}|} = 0.82$$

$$\frac{nf_H}{t} + \frac{f_H}{s} = -2.4$$

$$\frac{d_3}{f_H} = 0.41$$

TABLE 2

1st Embodiment

| Angle of View in<br>Main Scanning Direction | Radius of Curvature in<br>Sub Scanning Direction |
|---|---|
| +0 | −54.5 |
| +12 | −55.6 |
| +24 | −59.7 |

TABLE 3

2nd Embodiment

| | | |
|---|---|---|
| $d_1 = 155$ | $d_2 = 15$ | $d_3 = 175$ |
| $R_{1H} = 4560$ | $R_{2H} = -480$ | |
| $R_{1G} = 450$ | $R_{2G} = -54.0$ | |
| $a_{22} = 1.65 \times 10^{-7}$ | $a_{04} = 0$ | $a_{24} = 0$ |
| $n = 1.5722$ | $f_H = 408.3$ | |
| $t = -159.6$ | $s = 324.4$ | $s_1 = 484.4$ |

$$\frac{d_1}{d_3} = 0.89$$

$$\frac{|R_{1H}|}{|R_{2H}|} = 0.94$$

$$\frac{nf_H}{t} + \frac{f_H}{s} = -2.8$$

$$\frac{d_3}{f_H} = 0.43$$

TABLE 4

2nd Embodiment

| Angle of View in<br>Main Scanning Direction | Radius of Curvature in<br>Sub Scanning Direction |
|---|---|
| +0 | −54.0 |
| +12 | −55.0 |
| +24 | −58.9 |

TABLE 5

3rd Embodiment

| | | |
|---|---|---|
| $d_1 = 175$ | $d_2 = 15$ | $d_3 = 155$ |
| $R_{1H} = 400$ | $R_{2H} = -520$ | |
| $R_{1G} = 400$ | $R_{2G} = -54.3$ | |
| $a_{22} = 1.4 \times 10^{-7}$ | $a_{04} = 0$ | $a_{24} = 0$ |
| $n = 1.5722$ | $f_H = 397.5$ | |
| $t = -179.2$ | $s = 269.6$ | $s_1 = 448.8$ |

$$\frac{d_1}{d_3} = 1.13$$

$$\frac{|R_{1H}|}{|R_{2H}|} = 0.77$$

$$\frac{nf_H}{t} + \frac{f_H}{s} = -2.0$$

$$\frac{d_3}{f_H} = 0.39$$

TABLE 6

3rd Embodiment

| Angle of View in<br>Main Scanning Direction | Radius of Curvature in<br>Sub Scanning Direction |
|---|---|
| +0 | −54.3 |
| +12 | −55.7 |
| +24 | −60.4 |

TABLE 7

4th Embodiment

| | | |
|---|---|---|
| $d_1 = 130$ | $d_2 = 20$ | $d_3 = 130$ |
| $R_{1H} = 330$ | $R_{2H} = -580$ | |
| $R_{1G} = 330$ | $R_{2G} = -43.5$ | |
| $a_{22} = 2.7 \times 10^{-7}$ | $a_{04} = 0$ | $a_{24} = 0$ |
| $n = 1.5722$ | $f_H = 370.5$ | |
| $t = -134.7$ | $s = 224.1$ | $s_1 = 358.8$ |

$$\frac{d_1}{d_3} = 1$$

$$\frac{|R_{1H}|}{|R_{2H}|} = 0.57$$

$$\frac{nf_H}{t} + \frac{f_H}{s} = -2.7$$

$$\frac{d_3}{f_H} = 0.35$$

TABLE 8

4th Embodiment

| Angle of View in<br>Main Scanning Direction | Radius of Curvature<br>Sub Scanning Direction |
|---|---|
| +0 | −43.5 |
| +15 | −44.9 |
| +30 | −51.2 |

TABLE 9

5th Embodiment

| | | |
|---|---|---|
| $d_1 = 150$ | $d_2 = 15$ | $d_3 = 180$ |
| $R_{1H} = 405$ | $R_{2H} = -550$ | |
| $R_{1G} = 405$ | $R_{2G} = -54.4$ | |
| $a_{22} = 1.82 \times 10^{-7}$ | $a_{04} = 3.0 \times 10^{-9}$ | $a_{24} = 0$ |
| $n = 1.5722$ | $f_H = 410.0$ | |
| $t = -154$ | $s = 339.8$ | $s_1 = 493.8$ |

$$\frac{d_1}{d_3} = 0.83$$

$$\frac{|R_{1H}|}{|R_{2H}|} = 0.74$$

$$\frac{nf_H}{t} + \frac{f_H}{s} = -2.98$$

$$\frac{d_3}{f_H} = 0.44$$

TABLE 10

5th Embodiment

| Angle of View in Main Scanning Direction | Radius of Curvature in Main Scanning Direction | Radius of Curvature in Sub Scanning Direction |
|---|---|---|
| +0 | −550.0 | −54.4 |
| +12 | | −55.5 |
| +24 | −608.1 | −59.9 |

TABLE 11

6th Embodiment

| | | |
|---|---|---|
| $d_1 = 200$ | $d_2 = 25$ | $d_3 = 120$ |
| $R_{1H} = 355$ | $R_{2H} = -500$ | |
| $R_{1G} = 355$ | $R_{2G} = -50.0$ | |
| $a_{22} = 1.40 \times 10^{-7}$ | $a_{04} = -1.8 \times 10^{-9}$ | $a_{24} = 0$ |
| $n = 1.5722$ | $f_H = 366.7$ | |
| $t = -206.7$ | $s = 202.9$ | $s_1 = 409.6$ |

$$\frac{d_1}{d_3} = 1.7$$

$$\frac{|R_{1H}|}{|R_{2H}|} = 0.71$$

$$\frac{nf_H}{t} + \frac{f_H}{s} = -1.0$$

$$\frac{d_3}{f_H} = 0.33$$

TABLE 12

6th Embodiment

| Angle of View in Main Scanning Direction | Radius of Curvature in Main Scanning Direction | Radius of Curvature in Sub Scanning Direction |
|---|---|---|
| +0 | −500.0 | −50.0 |
| +12 | | −51.2 |
| +24 | −458.8 | −56.2 |

TABLE 13

7th Embodiment

| | | |
|---|---|---|
| $d_1 = 125$ | $d_2 = 15$ | $d_3 = 150$ |
| $R_{1H} = 350$ | $R_{2H} = -550$ | |
| $R_{1G} = 350$ | $R_{2G} = -45.4$ | |
| $a_{22} = 3.0 \times 10^{-9}$ | $a_{04} = 2.5 \times 10^{-9}$ | $a_{24} = 0$ |
| $n = 1.5722$ | $f_H = 376.0$ | |
| $t = -128.7$ | $s = 271.3$ | $s_1 = 400.0$ |

$$\frac{d_1}{d_3} = 0.84$$

$$\frac{|R_{1H}|}{|R_{2H}|} = 0.64$$

$$\frac{nf_H}{t} + \frac{f_H}{s} = -3.2$$

TABLE 13-continued

7th Embodiment $$\frac{d_3}{f_H} = 0.40$$

TABLE 14

7th Embodiment

| Angle of View in Main Scanning Direction | Radius of Curvature in Main Scanning Direction | Radius of Curvature in Sub Scanning Direction |
|---|---|---|
| +0 | −550.0 | −45.4 |
| +14 | −560.2 | −46.7 |
| +28 | −598.7 | −52.3 |

TABLE 15

8th Embodiment

| | | |
|---|---|---|
| $d_1 = 70$ | $d_2 = 30$ | $d_3 = 108.36$ |
| $R_{1H} = 250$ | $R_{2H} = -500$ | |
| $R_{1G} = 26.9$ | $R_{2G} = -500$ | |
| $a_{22} = 3.35 \times 10^{-6}$ | $a_{04} = 0$ | $a_{24} = 3.6 \times 10^{-10}$ |
| $n = 1.5722$ | $f_H = 295.564$ | |
| $t = -76.454$ | $s = 219.729$ | $s_1 = 296.183$ |

$$\frac{d_1}{d_3} = 0.646$$

$$\frac{|R_{1H}|}{|R_{2H}|} = 0.5$$

$$\frac{nf_H}{t} + \frac{f_H}{s} = -4.724$$

$$\frac{d_3}{f_H} = 0.367$$

TABLE 16

8th Embodiment

| Angle of View in Main Scanning Direction | Radius of Curvature in Sub Scanning Direction |
|---|---|
| +0 | 26.9 |
| +12 | 27.963 |
| +14 | 28.378 |
| +24 | 31.989 |
| +28 | 34.434 |
| +38 | 42.827 |

TABLE 17

9th Embodiment

| | | |
|---|---|---|
| $f = 250$ | $\omega = 62.6(\text{deg.})$ | $s = 502.9$ |
| $Y = 218$ | $s_1 = 600$ | $c = 97.1$ |
| $L = 271.21$ | $t = 20$ | $t_{min} = 7.25$ |

TABLE 17-continued

9th Embodiment

| Radius of curvature | Axial distance | Refractive index |
|---|---|---|
| $r_1$ = 470.81 | $d_1$ = 88.11 | n = 1.5722 |
| $r_2$ = −202.32 | $d_2$ = 20 | |
| | $d_3$ = 163.1 | |

<Aspherical Data of $r_2$> $\epsilon$ = 1

$A_4 = 2.276 \times 10^{-8}$    $A_6 = 5.414 \times 10^{-13}$
$A_8 = -8.128 \times 10^{-17}$   $A_{10} = 3.923 \times 10^{-25}$

TABLE 18

10th Embodiment

| f = 250 | ω = 62.6(deg.) | s = 501.27 |
|---|---|---|
| Y = 218 | $s_1$ = 600 | c = 95.73 |
| L = 268.93 | t = 17 | $t_{min}$ = 4.63 |

| Radius of curvature | Axial distance | Refractive index |
|---|---|---|
| $r_1$ = 467.49 | $d_1$ = 88.13 | n = 1.5722 |
| $r_2$ = −203.41 | $d_2$ = 17 | |
| | $d_3$ = 163.8 | |

<Aspherical Data of $r_2$> $\epsilon$ = 1

$A_4 = 2.373 \times 10^{-8}$    $A_6 = 4.802 \times 10^{-13}$
$A_8 = -8.489 \times 10^{-17}$   $A_{10} = 3.526 \times 10^{-25}$

TABLE 19

11th Embodiment

| f = 400 | ω = 56.2(deg.) | s = 282.845 |
|---|---|---|
| Y = 218 | $s_1$ = 380 | c = 97.155 |
| L = 268.37 | t = 15 | $t_{min}$ = 8.39 |

| Radius of curvature | Axial distance | Refractive index |
|---|---|---|
| $r_1$ = 177.94 | $d_1$ = 99.97 | n = 1.5722 |
| $r_2$ = 774.94 | $d_2$ = 15 | |
| | $d_3$ = 153.4 | |

<Aspherical Data of $r_2$> $\epsilon$ = 1

$A_4 = 6.031 \times 10^{-8}$    $A_6 = -1.025 \times 10^{-12}$
$A_8 = -6.816 \times 10^{-17}$   $A_{10} = -6.511 \times 10^{-22}$

TABLE 20

12th Embodiment

| f = 600 | ω = 35.6(deg.) | s = 380.39 |
|---|---|---|
| Y = 218 | $s_1$ = 570 | c = 189.62 |
| L = 427.9 | t = 15 | $t_{min}$ = 8.42 |

| Radius of curvature | Axial distance | Refractive index |
|---|---|---|
| $r_1$ = 330.55 | $d_1$ = 190 | n = 1.5722 |
| $r_2$ = 8730.1 | $d_2$ = 15 | |
| | $d_3$ = 222.9 | |

TABLE 20-continued

12th Embodiment

<Aspherical Data of $r_2$> $\epsilon$ = 1

$A_4 = 6.848 \times 10^{-9}$    $A_6 = -1.097 \times 10^{-13}$
$A_8 = 1.236 \times 10^{-18}$   $A_{10} = -6.871 \times 10^{-22}$

TABLE 21

13th Embodiment

| f = 500 | ω = 40.8(deg.) | s = 430.5 |
|---|---|---|
| Y = 218 | $s_1$ = 570 | c = 139.5 |
| L = 374.5 | t = 10 | $t_{min}$ = 4.25 |

| Radius of curvature | Axial distance | Refractive index |
|---|---|---|
| $r_1$ = 264.37 | $d_1$ = 140.1 | n = 1.5722 |
| $r_2$ = 3430.9 | $d_2$ = 10 | |
| | $d_3$ = 224.4 | |

<Aspherical Data of $r_2$> $\epsilon$ = 1

$A_4 = 2.096 \times 10^{-8}$    $A_6 = -1.905 \times 10^{-13}$
$A_8 = -2.992 \times 10^{-17}$   $A_{10} = -6.906 \times 10^{-22}$

TABLE 22

14th Embodiment

| f = 450 | ω = 46.4(deg.) | s = 381.7 |
|---|---|---|
| Y = 218 | $s_1$ = 500 | c = 118.3 |
| L = 330.3 | t = 15 | $t_{min}$ = 8.61 |

| Radius of curvature | Axial distance | Refractive index |
|---|---|---|
| $r_1$ = 219.119 | $d_1$ = 120 | n = 1.5722 |
| $r_2$ = 1433.4 | $d_2$ = 15 | |
| | $d_3$ = 195.3 | |

<Aspherical Data of $r_2$> $\epsilon$ = 1

$A_4 = 3.570 \times 10^{-8}$    $A_6 = -4.311 \times 10^{-13}$
$A_8 = -4.409 \times 10^{-17}$   $A_{10} = -6.936 \times 10^{-22}$

TABLE 23

15th Embodiment

| f = 450 | ω = 47.9(deg.) | s = 405.56 |
|---|---|---|
| Y = 218 | $s_1$ = 500 | c = 94.44 |
| L = 311.5 | t = 10 | $t_{min}$ = 5.36 |

| Radius of curvature | Axial distance | Refractive index |
|---|---|---|
| $r_1$ = 138.74 | $d_1$ = 100 | n = 1.5722 |
| $r_2$ = 292.93 | $d_2$ = 10 | |
| | $d_3$ = 201.5 | |

<Aspherical Data of $r_2$> $\epsilon$ = 1

$A_4 = 1.031 \times 10^{-7}$    $A_6 = -9.388 \times 10^{-13}$
$A_8 = -6.945 \times 10^{-17}$   $A_{10} = -6.956 \times 10^{-22}$

TABLE 24

16th Embodiment

| f = 400 | ω = 52.2(deg.) | s = 352.73 |
|---|---|---|
| Y = 218 | $s_1$ = 450 | c = 97.27 |
| L = 290.2 | t = 10 | $t_{min}$ = 4.25 |

| Radius of curvature | Axial distance | Refractive index |
|---|---|---|
| $r_1$ = 179.07 | $d_1$ = 100 | n = 1.5722 |
| $r_2$ = 797.67 | $d_2$ = 15 | |
| | $d_3$ = 174.2 | |

<Aspherical Data of $r_2$> $\epsilon$ = 1

$A_4 = 6.656 \times 10^{-8}$  $A_6 = -1.056 \times 10^{-12}$
$A_8 = -7.678 \times 10^{-17}$  $A_{10} = -6.507 \times 10^{-22}$

TABLE 25

| | $\frac{-nf}{c}$ | $\frac{f}{s}$ | $\frac{-nf}{c}, \frac{+f}{s}$ | | |
|---|---|---|---|---|---|
| 9th embodiment | −4.048 | 0.497 | −3.551 | −0.388 | 2.76 |
| 10th embodiment | −4.106 | 0.496 | −3.61 | −0.383 | 3.67 |
| 11th embodiment | −6.473 | 1.414 | −5.059 | −0.243 | 1.79 |
| 12th embodiment | −4.975 | 1.577 | −3.40 | −0.316 | 1.78 |
| 13th embodiment | −5.634 | 1.513 | −4.121 | −0.279 | 2.35 |
| 14th embodiment | −5.979 | 1.179 | −4.8 | −0.263 | 1.74 |
| 15th embodiment | −7.491 | 1.110 | −6.381 | −0.210 | 1.87 |
| 16th embodiment | −6.466 | 1.134 | −5.332 | −0.243 | 2.35 |

TABLE 26

17th Embodiment

| a = 18.08 mm | t = 28.67 mm | b = 108 mm |
|---|---|---|
| $S_1$ = 241.52 mm | f = 199.01 mm | c = 44.04 mm |
| G = 154.75 mm | $a_{ymax}$ = 15.75 mm | $Y_{max}$ = 36 mm |
| L = 221 mm | n = 1.5722 | 2ω = 103.2° |

[1st surface]

$r_1$ = −233.9 mm   $\mu$ = −46.819
$a_{04}$ = −0.72053 × 10$^{-5}$   $a_{06}$ = 0.12274 × 10$^{-8}$
$a_{08}$ = 0.41432 × 10$^{-12}$   $a_{010}$ = 0.93289 × 10$^{-16}$
$a_{012}$ = 0.34668 × 10$^{-18}$   $a_{014}$ = 0.10868 × 10$^{-22}$

[2nd surface]

$r_2$ = −80.007 mm   $\mu$ = −7.5331
$a_{04}$ = −0.37404 × 10$^{-5}$   $a_{06}$ = 0.41983 × 10$^{-9}$
$a_{08}$ = −0.55201 × 10$^{-12}$   $a_{010}$ = −0.3793 × 10$^{-16}$
$a_{012}$ = 0.13604 × 10$^{-18}$   $a_{014}$ = −0.8481 × 10$^{-22}$

TABLE 27

18th Embodiment

| a = 19.9 mm | t = 17.74 mm | b = 108 mm |
|---|---|---|
| $S_1$ = 241.52 mm | f = 218.54 mm | c = 32.2 mm |

TABLE 27-continued

18th Embodiment

| G = 154.64 mm | $a_{ymax}$ = 16.8 mm | $Y_{max}$ = 31 mm |
|---|---|---|
| L = 218 mm | n = 1.5722 | 2ω = 100° |

[1st surface]

$r_1$ = −1300.7 mm   $\mu$ = 55.853
$a_{04}$ = −0.11714 × 10$^{-4}$   $a_{06}$ = −0.23242 × 10$^{-8}$
$a_{08}$ = 0.24488 × 10$^{-12}$   $a_{010}$ = −0.10597 × 10$^{-15}$
$a_{012}$ = −0.14867 × 10$^{-16}$   $a_{014}$ = 0.93616 × 10$^{-22}$

[2nd surface]

$r_2$ = −144.65 mm   $\mu$ = 12.53
$a_{04}$ = −0.403 × 10$^{-5}$   $a_{06}$ = −0.54552 × 10$^{-10}$
$a_{08}$ = −0.17216 × 10$^{-11}$   $a_{010}$ = −0.3793 × 10$^{-5}$
$a_{012}$ = 0.20358 × 10$^{-17}$   $a_{014}$ = −0.19845 × 10$^{-20}$

TABLE 28

19th Embodiment

| a = 5.523 mm | t = 42.67 mm | b = 148 mm |
|---|---|---|
| $S_f$ = 241.52 mm | f = 170.51 mm | c = 71.26 mm |
| G = 196.20 mm | $a_{ymax}$ = 4.90 mm | $Y_{max}$ = 29 mm |
| L = 217.5 mm | n = 1.57222 | 2ω = 104° |

[1st surface]

$r_1$ = −42.17 mm   $\mu$ = −10.491
$a_{04}$ = −0.23381 × 10$^{-4}$   $a_{06}$ = 0.96019 × 10$^{-9}$
$a_{08}$ = 0.50438 × 10$^{-12}$   $a_{010}$ = 0.92630 × 10$^{-16}$
$a_{012}$ = −0.38919 × 10$^{-16}$   $a_{014}$ = 0.10917 × 10$^{-22}$

[2nd surface]

$r_2$ = −40.286 mm   $\mu$ = −0.71817
$a_{04}$ = −0.37401 × 10$^{-5}$   $a_{06}$ = −0.46958 × 10$^{-9}$
$a_{08}$ = −0.88085 × 10$^{-12}$   $a_{010}$ = −0.37930 × 10$^{-16}$
$a_{012}$ = 0.38461 × 10$^{-18}$   $a_{014}$ = −0.65222 × 10$^{-21}$

What is claimed is:

1. A scanning apparatus comprising:
   a deflector for deflecting a convergent luminous flux on a scanned surface at a uniform angular velocity to form an image so that the scanned surface is scanned substantially at a uniform velocity; and
   a single fθ lens located between the deflector and the scanned surface,
   wherein said single fθ lens is bi-convex in a main scanning direction and is made of a material having a refractive index of at most 1.6 and wherein a main curve of each of a first surface and a second surface of the single fθ lens in the main scanning direction forms a circle and wherein the following conditions are fulfilled:

$$0.7 \leq \frac{d_1}{d_3} \leq 1.3$$

$$0.3 < \frac{d_3}{f_H} < 0.5$$

where $d_1$ is a distance between a deflecting surface of the deflector and the first surface of the single fθ lens, $d_3$ is a distance between the second surface of the single fθ lens and the scanned surface, and $f_H$ is a focal length of the single fθ lens in the main scanning direction.

2. A scanning apparatus as claimed in claim 1 wherein at least one surface of the single fθ lens is a deformed toric surface such that a radius of curvature in a sub scanning direction increases as an angle of view in the main scanning direction increases.

3. A scanning apparatus as claimed in claim 1, wherein one surface of the single fθ lens is a spherical surface and another surface of the single fθ lens is a deformed toric surface.

4. A scanning apparatus comprising:

a deflector for deflecting a convergent luminous flux on a scanned surface at a uniform angular velocity to form an image so that the scanned surface is scanned substantially at a uniform velocity; and a single fθ lens located between the deflector and the scanned surface, wherein said single fθ lens is bi-convex in a main scanning direction and wherein a main curve of each of a first surface and a second surface of the single fθ lens in the main scanning direction forms a circle and wherein the following conditions are fulfilled:

$$0.7 \leq \frac{d_1}{d_3} \leq 1.3$$

$$0.4 < \frac{|R_{1H}|}{|R_{2H}|}$$

$$-3.5 < \frac{nf_H}{t} + \frac{f_H}{s}$$

where $R_{1H}$ is a radius of curvature of the first surface of the single $f_H$ lens in the main scanning direction, $R_{2H}$ is a radius of curvature of the second surface of the single fθ lens in the main scanning direction, $d_1$ is a distance between a deflecting surface of the deflector and the first surface of the single fθ lens, $d_3$ is a distance between the second surface of the single fθ lens and the scanned surface, n is a refractive index of the single fθ lens, fθ is a focal length of the single fθ lens in the main scanning direction, t is a distance between a front principal point of the single fθ lens and the defecting surface of the deflector, and s is a distance between the front principal point of the single fθ lens and a point of natural convergence of the convergent luminous flux, wherein at least one surface of the single fθ lens is a deformed toric surface such that a radius of curvature in a sub scanning direction increases as an angle of view in the main scanning direction increases.

5. A scanning apparatus comprising:

a deflector for deflecting a convergent luminous flux on a scanned surface at a uniform angular velocity to form an image so that the scanned surface is scanned substantially at a uniform velocity; and a single fθ lens located between the deflector and the scanned surface, wherein one surface of the single fθ lens is a spherical surface and another surface of the single fθ lens is a deformed toric surface and said single fθ lens is bi-convex in a main scanning direction and wherein a main curve of each of a first surface and a second surface of the single fθ lens in the main scanning direction forms a circle and wherein the following conditions are fulfilled:

$$0.7 \leq \frac{d_1}{d_3} \leq 1.3$$

$$0.4 < \frac{|R_{1H}|}{|R_{2H}|}$$

$$-3.5 < \frac{nf_H}{t} + \frac{f_H}{s}$$

where $R_{1H}$ is a radius of curvature of the first surface of the single fθ lens in the main scanning direction, $R_{2H}$ is a radius of curvature of the second surface of the single fθ lens in the main scanning direction, $d_1$ is a distance between a deflecting surface of the deflector and the first surface of the single fθ lens, $d_3$ is a distance between the second surface of the single fθ lens and the scanned surface, n is a refractive index of the single fθ lens, $f_H$ is a focal length of the single fθ lens in the main scanning direction, t is a distance between a front principal point of the single fθ lens and the defecting surface of the deflector, and s is a distance between the front principal point of the single fθ lens and a point of natural convergence of the convergent luminous flux.

* * * * *